(12) United States Patent
Shimazaki et al.

(10) Patent No.: US 7,113,453 B1
(45) Date of Patent: Sep. 26, 2006

(54) METHOD FOR RECORDING AND REPRODUCTION ON A MAGNETO-OPTICAL RECORDING MEDIUM

(75) Inventors: Katsusuke Shimazaki, Ibaraki (JP); Norio Ohta, Ibaraki (JP); Akiyoshi Ito, Matsudo (JP); Katsuji Nakagawa, Tokyo (JP); Kazuko Inoue, Ryugasaki (JP)

(73) Assignee: Hitachi Maxell, Ltd., Ibaraki (JP)

( * ) Notice: Subject to any disclaimer, the term of this patent is extended or adjusted under 35 U.S.C. 154(b) by 0 days.

(21) Appl. No.: 09/321,795

(22) Filed: May 28, 1999

Related U.S. Application Data

(62) Division of application No. 08/981,308, filed as application No. PCT/JP96/01938 on Jul. 12, 1996, now Pat. No. 5,923,625.

(30) Foreign Application Priority Data

Jul. 13, 1995 (JP) .................................. 7-200555

(51) Int. Cl.
G11B 11/00 (2006.01)
G11B 7/24 (2006.01)
(52) U.S. Cl. ................................. 369/13.1; 369/275.1
(58) Field of Classification Search ................ 369/13, 369/275.1, 275.3, 275.4, 275.2, 44.38, 110, 369/116, 109, 100, 94, 13.35, 13.4, 13.24, 369/283, 286, 13.28, 112.24, 44.37, 13.1; 428/64.4
See application file for complete search history.

(56) References Cited

U.S. PATENT DOCUMENTS

| | | | | |
|---|---|---|---|---|
| 4,807,204 A | * | 2/1989 | Mizutani et al. ............... | 369/13 |
| 5,357,493 A | * | 10/1994 | Okazaki et al. ........... | 369/13.24 |
| 5,442,597 A | | 8/1995 | Spruit et al. ................... | 369/13 |
| 5,461,602 A | | 10/1995 | Moriya et al. ............... | 369/116 |
| 5,708,652 A | | 1/1998 | Ohki et al. .............. | 369/275.1 |
| 5,732,065 A | | 3/1998 | Braat et al. .............. | 369/275.1 |
| 5,923,625 A | * | 7/1999 | Shimazaki et al. ........... | 369/13 |

FOREIGN PATENT DOCUMENTS

JP A-8129784 5/1996

OTHER PUBLICATIONS

Saito et al, "Multi-valued Magneto-Optical Recording in TbFe Compositionally Modulated Films," 1989; Digests of the 13th Annual Conference on Magnetics in Japan; Proceeding of 13th Congress of Applied Magnetics Society; p. 63.

(Continued)

Primary Examiner—Ali Neyzari
(74) Attorney, Agent, or Firm—Birch, Stewart, Kolasch & Birch, LLP

(57) ABSTRACT

A magneto-optical recording medium and a method for recording and reproduction thereon are provided in order to reproduce information recorded by multi-valued recording at a high S/N ratio. Disclosed is a magneto-optical recording medium including two magnetic layers capable of four-valued recording based on four combined magnetization states. Magnitudes of reproduction signals concerning the four magnetization states, obtained upon reproduction at a wavelength $\lambda_1$, are different from those obtained upon reproduction at a wavelength $\lambda_2$. The two magnetic layers, on which a signal (a) is recorded, are irradiated with light beams having the wavelengths $\lambda_1$ and $\lambda_2$ respectively. Signals (d), (e) reproduced from respective reflected light beams are sliced by using at least one slice level to obtain two-valued or higher multi-valued reproduction signals respectively. The two-valued or higher multi-valued reproduction signals (f), (g) from the respective wavelengths are mutually subjected to logical operation to reproduce recorded information (i).

14 Claims, 19 Drawing Sheets

OTHER PUBLICATIONS

Saito et al., "Multi-valued Magneto-Optical Recording in TbFe/SiO Compositionally Modulated Films," 1989; Proceeding of the International Symposium on Optical Memory; Japanese Journal of Applied Physics, vol. 28 (1989) Suppl. 28-3; pp. 343-347.

* cited by examiner

METHOD FOR RECORDING AND REPRODUCTION ON A MAGNETO-OPTICAL RECORDING MEDIUM

This application is a divisional of application Ser. No. 08/981,308, filed on Dec. 16, 1997, now U.S. Pat. No. 5,923,625. Application Ser. No. 08/981,308 is the national phase of PCT International Application No. PCT/JP96/01938 filed on Jul. 12, 1996 under 35 U.S.C. § 371. The entire contents of each of the above-identified applications are hereby incorporated by reference.

TECHNICAL FIELD

The present intention relates to a magneto-optical recording medium and a method for recording and reproduction thereon. In particular, the present invention relates to a magneto-optical recording medium including a plurality of magnetic layers capable of multi-valued recording or multi-layered recording, and a method for recording and reproduction thereon.

BACKGROUND ART

Development in information processing technology in recent years involves the use of optical recording media as recording media having a small size and a large capacity. Such optical recording media are classified into recording media exclusively used for reproduction such as CD and CD-ROM, write-once type recording media on which information can be written only once, and rewritable type recording media on which information can be rewritten. Known rewritable recording media include magneto-optical recording media such as magneto-optical disks. Recording is performed on such a magneto-optical recording medium by applying an external magnetic field while irradiating a recording layer (magnetic layer) with a laser light beam so that the polarity of magnetization in the recording layer is inverted into a direction of the external magnetic field.

It is also one of important technical tasks for the magneto-optical recording medium to achieve a high recording density. A system for recording signals converted into multi-valued information has been hitherto known as a means for achieving a high density on a magneto-optical recording medium, as described in, for example, Proceedings of 13th Congress of Applied Magnetics Society (published in 1989, page 68) and Japanese Journal of Applied Physics, Vol. 28 (1989) Supplement 28-3, pp. 343–347.

In such a multi-valued recording system, a plurality of magnetic layers having mutually different coercive forces are stacked, and magnetization of a specified magnetic layer is selectively magnetically inverted by modulating, at multiple levels, the intensity of a magnetic field applied to the magnetic layers. It is described that four-valued (quaternary) signal recording can be achieved in accordance with this system by providing, in a recording medium, three magnetic layers having mutually different coercive forces However, according to the multi-valued recording system applied to the magneto-optical recording medium as described above, in order to detect, upon reproduction, signals recorded as multi-valued signals, the multi-valued signals have been distinguished by slicing, at a plurality of levels, signals detected from the magneto-optical recording medium. Accordingly, it has been impossible to obtain a large difference in signal amplitude corresponding to each of multi-valued states, and it has been difficult to clearly distinguish two states with a close difference in signal amplitude therebetween. For this reason, a problem arises in that the S/N ratio is low with respect to reproduced multi-valued signals. Therefore, it has been demanded to realize a reproduction technique for obtaining reproduction signals at a high S/N ratio from a certain magneto-optical recording medium subjected to high density recording.

As for magneto-optical recording media each having a plurality of magnetic layers, a recording medium, in which information can be recorded and reproduced independently on each of magnetic layers, may serve as an extremely effective recording medium when various types of information are recorded on a single recording medium in a correlated manner, or when they are simultaneously recorded and reproduced in parallel together with a plurality pieces of channel information.

JP-A-4305841 discloses a method for reproducing a multilevel information which has been recorded by illuminating with a recording light a magneto-optical recording medium, which has a magneto-optical layer wherein a magnetization direction may be changed by means of a magnetic field and heat with the illumination of the light, and an enhanced layer wherein a refractive index with respect to a reproducing light may be changed depending on a heating condition with the illumination light, to independently vary the magnetization direction of the magneto-optical recording layer and the refractive index of the enhanced layer. In the method, the information is reproduced by illuminating the magneto-optical recording medium, onto which the multilevel information has been recorded, with two reproducing lights having different wavelength in order to independently detect the intensity of the respective lights. The enhanced layer must have a characteristic that the refractive index with respect to an illumination light used for reproduction is changed depending on a heating condition based on illumination of the light.

JP-A-7147027 discloses a method for reproducing a multilevel information from a magneto-optical recording medium having a first magnetic recording layer and a second agnetic recording layer by using two laser beams with length $\lambda1, \lambda2$. The magneto-optical recording medium needs to use a spacer layer for transmitting the laser beam having the wavelength $\lambda2$ and reflecting the laser beam having the wavelength $\lambda1$.

DISCLOSURE OF INVENTION

The present invention has been made in order to solve the problems caused by the conventional techniques as described above, an object of which is to provide a novel method for recording and reproduction on a magneto-optical recording medium in which information recorded by multi-valued recording can be reproduced at a high S/N ratio.

Another object of the present invention is to provide a novel method for recording and reproduction on a magneto-optical recording medium having a plurality of magnetic layers in which data can be independently recorded (recorded in multi-layers) or reproduced on each of magnetic layers of the magneto-optical recording medium.

Still another object of the present invention is to provide a magneto-optical recording medium which is used for the method for recording and reproduction on the magneto-optical recording medium according to the present invention, on which reproduction signals can be reproduced at a high S/N ratio from the magneto-optical recording medium subjected to multi-valued recording.

Still another object of the present invention is to provide a novel magneto-optical recording medium which is used for the method for recording and reproduction on the magneto-optical recording medium according to the present invention, having a plurality of magneto-optical recording layers, on which data can be independently recorded and reproduced on each of the recording layers.

According to a first aspect of the present invention, there is provided a method for recording and reproduction on a magneto-optical recording medium including a plurality of magnetic layers, in which multi-valued information is recorded on the magneto-optical recording medium as a combination of magnetization states of the respective magnetic layers, and the multi-valued information is reproduced on the basis of an aggregate of the magnetization states of the respective magnetic layers, characterized in that:

the plurality of the magnetic layers are irradiated with light beams having wavelengths $\lambda_1$ and $\lambda_2$ ($\lambda_2 \neq \lambda_1$) respectively, signals reproduced from reflected light beams having the respective wavelengths are converted into two-valued (binary) or higher multi-valued reproduction signals respectively, and then the converted reproduction signals concerning the respective wavelengths are mutually subjected to logical operation to reproduce the recorded multi-valued information.

It is preferred in the method for recording and reproduction described above that the magneto-optical recording medium to be used is a magneto-optical recording medium in which a ratio of intensities of reproduction signals detected for a plurality of magnetization states determined by the combination of the magnetization states, concerning the reproduction signals obtained at the wavelength $\lambda_1$, is mutually different from that concerning reproduction signals obtained at the wavelength $\lambda_2$. It is also possible that the magneto-optical recording medium to be used is a magneto-optical recording medium in which an order of intensities of a plurality of reproduction signals detected for a plurality of magnetization states determined by the combination of the magnetization states, obtained upon detection at the wavelength $\lambda_1$, is mutually different from that obtained upon detection at the wavelength $\lambda_2$.

It is preferred in the method for recording and reproduction described above, according to an embodiment of the present invention, that the magneto-optical recording medium to be used is a magneto-optical recording medium including two magnetic layers capable of four-valued recording on the basis of four combined magnetization states, in which magnitudes of reproduction signals $\theta_1$ to $\theta_4$ from the four magnetization states, obtained upon reproduction at the wavelength $\lambda_1$, are different from those obtained upon reproduction at the wavelength $\lambda_2$, wherein the two magnetic layers are irradiated with the light beams having the wavelengths $\lambda_1$ and $\lambda_2$ respectively, signals reproduced from respective reflected light beams are sliced by using at least one level to obtain two-valued or higher multi-valued reproduction signals respectively, and the two-valued or higher multi-valued reproduction signals concerning the respective wavelengths are mutually subjected to a logical operation to reproduce information recorded by four-valued recording.

The principle of the method for recording and reproduction according to the first aspect of the present invention will be explained below. Explanation will be made as exemplified by reproduction of a four-valued recording signal recorded on a magneto-optical recording medium having two magnetic layers (recording layers) produced in the first embodiment described later on. FIG. 3 (a) illustrates magnetization states of first and second magnetic layers (recording layers) subjected to recording in accordance with the fourth embodiment described later on. Four combined magnetization states of (↑↑), (↑↓), (↓↑), (↓↓) exist on the magneto-optical recording medium based on combinations of magnetization directions on the first and second magnetic layers. The magnetization states are depicted in an order from the first magnetic layer to the second magnetic layer. The four combined magnetization states correspond to recorded four-valued signals, i.e., "0", "1", "2", "3" respectively. The four-valued signals have been recorded in accordance with the recording principle explained in the embodiments by applying, upon recording, external magnetic fields having intensities of H0, H1, H2, H3 to the magneto-optical recording medium respectively. As for information recorded on the basis of the combinations of the four magnetization states, the magneto-optical recording medium is irradiated with reproducing light beams at $\lambda_1$=443 nm and $\lambda_2$=780 nm to obtain reflected light beams therefrom so that magnitudes of apparent Kerr rotation angles are determined as reproduction signals. The term "apparent Kerr rotation angle" herein means a Kerr rotation angle detected from a reflected light beam from a magneto-optical recording medium irradiated with a reproducing light beam. The apparent Kerr rotation angle is detected as a value which is larger than that of a Kerr rotation angle representing an actual magnetization state of a magnetic layer due to a multiple interference effect on a protective layer in the recording medium or a Faraday effect of a recording layer, which is also called "effective Kerr rotation angle". FIG. 3 (b) shows relative signal outputs from the respective states reproduced with the reproducing light beam at $\lambda_1$=443 nm, and FIG. 3 (c) shows relative signal outputs from the respective states reproduced with the reproducing light beam at $\lambda_1$=780 nm. As for the magneto-optical recording medium used in the method for recording and reproduction according to the present invention, the apparent Kerr rotation angle obtained with the reproducing light beam varies depending on the wavelength of the reproducing light beam especially due to the multiple interference of the reproducing light beam in the first dielectric layer. As shown in FIG. 2, reproduction signal intensities for the four magnetization state "0", "1", "2", "3" determined by the combination of the respective magnetic layers, i.e., apparent Kerr rotation angles, vary depending on the wavelength of the reproducing light beam. In FIG. 2, a difference F in the Kerr rotation angle between the states "1" and "0", a difference E in the Kerr rotation angle between the states "0" and "3", and a difference D in the Kerr rotation angle between the states "3" and "2" are approximately the same in the vicinity of a wavelength $\lambda$=630 nm. However, in a longer wavelength region, for example, a difference A in the Kerr rotation angle between the states "2" and "3" and a difference B in the Kerr rotation angle between the states "0" and "1" at a wavelength $\lambda$=780 nm are fairly larger than the corresponding differences D and F in the Kerr rotation angle at the wavelength $\lambda$=630 nm. On the other hand, on a shorter wavelength side, a difference C in the Kerr rotation angle between the state "3" and "0"especially in the vicinity of 443 nm is fairly larger than the corresponding difference E in the Kerr rotation angle in the vicinity of the wavelength $\lambda$=630 nm. According to these facts, it is recognizable that a higher S/N ratio is obtained by distinguishing and detecting the four states by using the two wavelengths of 443 nm and 780 nm, as compared with detection by dividing signal amplitudes corresponding to the four values of the states "0", "1", "2", "3" by using the single wavelength of 630 nm. According to the embodiment of the present invention, a reproduction signal is detected by using the reproducing light beam at $\lambda_1=4$ nm, and then it is sliced at an appropriate level to provide for separation into two-valued values concerning the state "0" or "1" and the state "2" or "3", while a reproduction signal is detected by using the reproducing light beam at $\lambda_2=780$ nm, and then it is sliced at appropriate levels to provide for separation into three levels of the state "0" or "3", the state "1", and the state "2" so that two series of two-valued signals are obtained from which a recording signal recorded on the multiple layers (two layers) can be reproduced.

According to a second aspect of the present invention, there is provided a method for recording and reproduction on a magneto-optical recording medium including a plurality of magnetic layers, in which multi-valued information or a plurality of two-valued information arrays are recorded on the magneto-optical recording medium as a combination of magnetization states of the respective magnetic layers, and the multi-valued information or the plurality of the two-valued information arrays are reproduced on the basis of an aggregate of the magnetization states of the respective magnetic layers, characterized in that:

the plurality of the magnetic layers are irradiated with light beams having wavelengths $\lambda_1$ and $\lambda_2$ respectively, information recorded on one of the magnetic layers is reproduced by using the light beam having the wavelength $\lambda_1$, information recorded on another of the magnetic layers is reproduced by using the light beam having the wavelength $\lambda_2$ ($\lambda_2 \neq \lambda_1$) and thus information is independently reproduced from each of the magnetic layers.

It is preferred in the method for recording and reproduction described above that the magneto-optical recording medium to be used is a magneto-optical recording medium in which an order of intensities of a plurality of reproduction signals detected for a plurality of magnetization states determined by the combination of the magnetization states, obtained upon detection at the wavelength $\lambda_1$, is mutually different from that obtained upon detection at the wavelength $\lambda_2$.

It is preferred in the method for recording and reproduction described above that the magneto-optical recording medium to be used is a magneto-optical recording medium including two magnetic layers capable of four-valued recording on the basis of four combined magnetization states, in which an order of magnitudes of reproduction signals $\theta_1$ to $\theta_4$ from the four magnetization states, obtained upon detection at the wavelength $\lambda_1$, is different from that obtained upon detection at the wavelength $\lambda_2$, wherein two-valued information on one of the magnetic layers is reproduced by using the light beam having the wavelength $\lambda_1$, and two-valued information on the other magnetic layer is reproduced by using the light beam having the wavelength $\lambda_2$. In this embodiment, a two-valued signal converted into two-valued one by slicing, at a predetermined level, a reproduction signal including the four magnetization states detected at the wavelength $\lambda_1$ may be allowed to correspond to a two-valued magnetization state of one of the magnetic layers, and a two-valued signal converted into two-valued one by slicing, at a predetermined level, a reproduction signal including the four magnetization states detected at the wavelength $\lambda_2$ may be allowed to correspond to a two-valued magnetization state of the other magnetic layer.

Now the principle of the method for recording and reproduction according to the second aspect of the present invention will be explained with reference to FIGS. 5 and 6. FIG. 6 (a) illustrates recorded magnetization states of first and second magnetic layers of a magneto-optical disk produced in the second embodiment of the present invention. Four combined magnetization states of (↑↑), (↑↓), (↓↑), (↓↓) exist on the magneto-optical recording medium based on combinations of magnetization directions on the first and second magnetic layers. The four combined magnetization states correspond to recorded four-valued recording signals, i.e., "0", "1", "2", "3" respectively. The four-valued signals have been recorded by applying external magnetic fields having intensities of H0, H1, H2, H3 to the magneto-optical recording medium respectively. In this method for recording and reproduction, information on the first magnetic layer and two-valued information recorded on the second magnetic layer can be independently determined by using the reproducing light beam at $\lambda_1=443$ nm and the reproducing light beam at $\lambda_2=780$ nm respectively. The magneto-optical recording medium used for the method for recording and reproduction according to the present invention has a characteristic, as shown in FIG. 5, that a curve, which represents variation in the apparent Kerr rotation angle with respect to the wavelength concerning one magnetization state (determined by magnetization states of the two magnetic layers), intersects a curve which represents variation in the apparent Kerr rotation angle with respect to the wavelength concerning another magnetization state, in a range of the two reproducing wavelengths $\lambda_1$ and $\lambda_2$ (a curve for the state "0" and a curve for the state "3" in FIG. 5). This characteristic can be specifically achieved by adjusting optical lengths (thicknesses and refractive indexes) of the first dielectric layer and the plurality of magnetic layers with respect to the reproducing wavelengths $\lambda_1$ and $\lambda_2$. FIGS. 6 (b) and (c) illustrate relative signal outputs concerning the respective magnetization states reproduced by using the light beams at $\lambda_1$ and $\lambda_2$. As for this medium, the level (apparent Kerr rotation angle) of the reproduction signal concerning the state "0" intersects that concerning the state "3" in the vicinity of 630 nm (FIG. 5). Accordingly, the order of magnitudes of reproduction signals for the states "0" and "3" is different between $\lambda_2=780$ nm and $\lambda_1=443$ nm. Namely, the signal output decreases in an order of "2", "3", "0", "1" upon reproduction with the reproducing light beam at $\lambda_1=443$ nm, while the signal output decreases in an order of "2", "0", "3", "1" upon reproduction with the reproducing light beam at $\lambda_2=780$ nm. Now when the reproduction signal is sliced at an intermediate level of the reproduction signal output at $\lambda_1=443$ nm shown in FIG. 6 (b), then it is possible to distinguish a set of the two states of "2" and "3" from a set of the two states of "0" and "1". According to inspection of the magnetization states of the two sets of the states, it is recognizable that the set of the two states of "2" and "3" and the set of the two states of "0" and "1" can be distinguished into two-valued information on the basis of the magnetization state of the first magnetic layer. Namely, both of the states "2" and "3" provide a magnetization state ↓ of the first magnetic layer, while both of the states "0" and "1" provide a magnetization state ↑ of the first magnetic layer. Therefore, a two-valued signal, obtained by slicing the reproduction signal at the intermediate level of the reproduction signal output at $\lambda_1=443$ nm, may be allowed to correspond to the two-valued magnetization state of the first magnetic layer. On the other hand, when the reproduction signal is sliced at an intermediate level of the reproduction signal output at $\lambda_2=780$ nm shown in FIG. 6 (c), then a set of the two states of "2" and "0" is distinguished from a set of the two states of "3" and "1", and they can be recognized by using two-valued information. According to inspection of the magnetization states of the set of the states "2" and "0" and the set of states "3" and "1", both of the magnetization states of the second magnetic layer are ↑ in the former set, while both of the magnetization states of the second magnetic layer are ↓ in the latter set. Therefore, a two-valued signal, obtained by slicing the reproduction signal at the intermediate level of the reproduction signal output at $\lambda_2$=780 nm, may be allowed to correspond to the two-valued magnetization state of the second magnetic layer. Therefore, the use of the magneto-optical recording medium provided with the reproduction signal characteristic as shown in FIGS. 6 (b) and (c) makes it possible to independently reproduce two-valued information recorded on the first magnetic layer and two-valued information recorded on the second magnetic layer by selecting the wavelength $\lambda_1$ or $\lambda_2$ of the reproducing light beam. In this embodiment, it is unnecessary for a focal point of an irradiating laser beam to be adjusted at a magnetic layer intended to perform reproduction thereon.

The reproducing wavelength is not specifically limited in the method for recording and reproduction on the magneto-optical recording medium of the present invention. However, the reproducing wavelength is preferably $\lambda_1$=350 to 900 nm because it is within a wavelength region capable of emission by using currently available various laser apparatuses or capable of emission by using a combination with an SHG (secondary higher harmonic wave generation) device. The reproducing wavelength $\lambda_2$ is desirably different in wavelength from $\lambda_1$ by not less than 50 nm in order to separate pieces of information on the respective magnetic layers at a high S/N ratio. In the method for recording and reproduction described above, the light beams at $\lambda_1$ and $\lambda_2$ can be radiated so that they are collected at different portions of a recording area on the magneto-optical recording medium.

In the method for recording and reproduction according to the second aspect described above, the light beam having the wavelength $\lambda_1$ or $\lambda_2$ is radiated to reproduce information recorded on one of the magnetic layers (recording layers), while recording is performed by combining the reproduced information with information to be recorded on another of the magnetic layers so that only information on the another of the magnetic layers may be rewritten in a virtual manner. In the method for recording and reproduction according to the second aspect of the present invention, information recorded on each of the magnetic layers can be independently reproduced by using a different wavelength for each of the magnetic layers. Therefore, when only one magnetic layer is subjected to rewriting, then information on another magnetic layer not subjected to rewriting is previously reproduced by allowing a reproducing light beam to precede a recording light beam in order to perform scanning on a recording track, and a magnetic field modulation signal is formed by combining the reproduced information with information to be recorded on the magnetic layer subjected to rewriting so that the two magnetic layers are heated by the recording light beam to perform recording while applying a magnetic field in conformity with the modulation signal. Thus only one magnetic layer is consequently subjected to rewriting.

According to a third aspect of the present invention, there is provided a magneto-optical recording medium to be used for the method for recording and reproduction according to the first aspect of the present invention, including a plurality of magnetic layers on a substrate, on which multi-valued information is recorded on the basis of a combination of magnetization states of the plurality of the magnetic layers, characterized in that:

a ratio of magnitudes of Kerr rotation angles read from a plurality of magnetization states determined by the combination of the magnetization states, obtained upon reproduction by using a light beam having a wavelength $\lambda_1$, is mutually different from that obtained upon reproduction by using a light beam having a wavelength $\lambda_2$.

It is preferred in the magneto-optical recording medium described above that optical path lengths of layers for constructing the magneto-optical recording medium are adjusted so that the ratio of magnitudes of Kerr rotation angles read from a plurality of magnetization states determined by the combination of the magnetization states, obtained upon reproduction by using the light beam having the wavelength $\lambda_1$, is mutually different from that obtained upon reproduction by using the light beam having the wavelength $\lambda_2$.

According to a fourth aspect of the present invention, there is provided a magneto-optical recording medium to be used for the method for recording and reproduction according to the second aspect of the present invention, including a plurality of magnetic layers on a substrate, on which multi-valued information or a plurality of two-valued information arrays are recorded on the basis of a combination of magnetization states of the plurality of the magnetic layers, characterized in that:

magnitudes of Kerr rotation angles read from a plurality of magnetization states determined by the combination of the magnetization states differ depending on a wavelength of a reproducing light beam respectively; and the magneto-optical recording medium has a magneto-optical characteristic that a curve, which represents variation in the Kerr rotation angle with respect to the wavelength of the reproducing light beam detected from one combined magnetization state, intersects a curve which represents variation in the Kerr rotation angle with respect to the wavelength of the reproducing light beam detected from at least one of other combined magnetization states, in a wavelength range of $\lambda_1$ to $\lambda_2$ of the wavelength of the reproducing light beam.

It is preferred in the magneto-optical recording medium described above that the magneto-optical recording medium includes at least one dielectric layer and the plurality of the magnetic layers on a substrate, and optical path lengths of the at least one dielectric layer and the plurality of the magnetic layers are adjusted so that the magneto-optical recording medium has the magneto-optical characteristic that the curve, which represents variation in the Kerr rotation angle with respect to the wavelength of the reproducing light beam detected from one combined magnetization state, intersects the curve which represents variations in the Kerr rotation angle with respect to the wavelength of the reproducing light beam detected from at least one of other combined magnetization states, in the wavelength range of $\lambda_1$ to $\lambda_2$ of the wavelength of the reproducing light beam.

The magneto-optical recording medium according to the present invention may typically comprise a first dielectric layer, a first magnetic layer (recording layer), a second dielectric layer, a second magnetic layer (recording layer), an auxiliary magnetic layer, a third dielectric layer, a metallic reflective layer, and a protective layer, the layers being successively stacked on a transparent substrate. The structure as described above is preferred for magnetic field modulation recording. However, the present invention is not limited thereto. It is allowable to adopt various structures in conformity with recording systems.

The first dielectric layer is provided as a layer for making multiple interference of the reproducing light beam, and increasing the apparent Kerr rotation angle, and it is generally formed of an inorganic dielectric material having a refractive index larger than that of the transparent substrate. Those preferred for the first dielectric layer include, for example, oxides or nitrides of silicon, aluminum, zirconium, titanium, and tantalum, and those especially preferred include SiN. It is important for the magneto-optical recording medium of the present invention to have the features defined in the third and fourth aspects of the present invention by controlling the optical length of the first dielectric layer, i.e., the refractive index and the thickness of the first dielectric layer. When the first dielectric layer is composed of SiN, it preferably has an refractive index of 1.90 to 2.40. The first dielectric layer composed of SiN having the refractive index as described above can be obtained by adjusting a mixing ratio of sputtering atmosphere gases in conformity with a composition of $SiN_x$ upon production of SiN by means of a dry process such as a sputtering method. The first dielectric layer preferably has a thickness of 400 to 1,100 A (angstroms).

The magnetic layer of the magneto-optical recording medium of the present invention may be composed of an amorphous vertically magnetizable film comprising an alloy of a rare earth metal-transition metal system. Especially, when recording is performed in accordance with the magnetic field modulation system, the magnetic layer is preferably composed of a material represented by the following general formula:

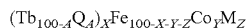

$(Tb_{100-A}Q_A)_X Fe_{100-X-Y-Z} Co_Y M_Z$ wherein:
15 atomic % ≦ X ≦ 40 atomic %;
5 atomic % ≦ Y ≦ 20 atomic %;
0 atomic % ≦ Z ≦ 15 atomic %;
0 atomic % ≦ A ≦ 30 atomic %;

wherein M is at least one of elements selected from the group consisting of Nb, Cr. Pt, Ti, and Al, and Q is at least one of elements selected from the group consisting of Gd, Nd, and Dy.

When the recording layer comprises two magnetic layers, both of the first and second magnetic layers may be composed of the alloy of the rare earth metal-transition metal system having the composition described above. The first magnetic layer preferably has a thickness of 20 to 200 A (angstroms), and the second magnetic layer preferably has a thickness of 50 to 500 A (angstroms). The first and second magnetic layers may have various combinations of their Curie temperatures and thicknesses. However, the first and second magnetic layers preferably have their Curie temperatures which are approximate to one another as close as possible in order to provide a uniform size of magnetic domains recorded on each of the layers. It is preferred that the difference in Curie temperature between the respective layers is within 30° C. It is optimum that the respective layers have an equal Curie temperature. It is also possible to form a film obtained by stacking three or more magnetic layers.

The auxiliary magnetic layer is added to the magnetic layer which is in charge of recording so that the auxiliary magnetic layer serves to control an external condition under which recording (i.e., inversion of magnetization) occurs on the magnetic layer. The auxiliary magnetic layer is provided, for example, for controlling a region of an external magnetic field to generate a magnetization state of each of the directions (↑ or ↓) during recording so that a combination of magnetization states to be generated on each of the stacked magnetic layers which are in charge of recording is generated under a mutually different recording condition. The auxiliary magnetic layer may be composed of, for example, an amorphous vertically magnetizable film of a rare earth-transition metal system, an alloy thin film composed of at least one of elements selected from the group consisting of noble metals such as Pt, Al, Ag, Au, Cu, and Rh, and at least one of elements selected from the group consisting of transition metals such as Fe, Co, and Ni, or a film composed of a simple substance of a transition metal such as Fe, Co, and Ni or an alloy film thereof. The auxiliary magnetic layer may have a thickness of 5 to 1,500 A (angstroms).

The metallic reflective layer reflects the reproducing light beam having passed through the respective layers to return the light beam toward the transparent substrate so that the apparent Kerr rotation angle may be increased owing to the Faraday effect exerted during transmission through the magnetic layer. The metallic reflective layer is preferably composed of an alloy comprising at least one of metal elements selected from the group consisting of Al, Ag, Au, Cu, and Be and at least one of metal elements selected from the group consisting of Cr, Ti, Ta, Sn, Si, Pe, Nb, Mo, Li, Mg, W, and Zr.

The second and third dielectric layers make multiple interference of the reproducing light beam having passed through the respective layers so that the Kerr-rotation angle may be increased, in the same manner as described for the first dielectric layer. The second and third dielectric layers may be composed of the group of materials which may be used to construct the first dielectric layer. In addition, the respective dielectric layers and the metallic reflective layer also serve as heat control layers to obtain an appropriate recording power sensitivity or an appropriate recording power margin, and they also serve to protect the recording layer from chemical shock. The second and third dielectric layers and the metallic reflective layer are optional layers, which may be omitted.

The transparent substrate used herein is composed of a transparent resin material including, for example, polycarbonate, polymethyl methacrylate, and epoxy, on which a preformat pattern is formed.

The protective layer is an uppermost layer, which may be composed of, for example, an ultraviolet-curable resin. The magneto-optical recording medium having the structure as described above is preferably produced by a dry process such as sputtering and vapor deposition.

The thickness of each of the first to third dielectric layers, the first and second magnetic layers, and the auxiliary magnetic layer included in the magneto-optical recording medium of the present invention is appropriately adjusted in accordance with the way of change of the apparent Kerr rotation angle depending on the reproducing wavelength, the apparent Kerr rotation angle being obtained on the basis of a plurality of the magnetization states determined by the combination of magnetization states of each of the magnetic layers. Specifically, the thickness of each of the layers is adjusted so that the ratio and/or the order of magnitudes of apparent Kerr rotation angles obtained on the basis of a plurality of combined magnetization states is different between the selected two reproducing wavelengths.

BRIEF DESCRIPTION OF DRAWINGS

FIG. 3 (a) shows recorded magnetization states on the two magnetic layers, FIG. 3 (b) shows relative signal outputs from the four states when reproduction is performed by using a reproducing light beam at $\lambda_1$=443 nm, and FIG. 3 (c) shows relative signal outputs from the four states when reproduction is performed by using a reproducing light beam at $\lambda_1$=780 nm.

FIG. 6 (a) shows recorded magnetization states on the two magnetic layers, FIG. 6 (b) shows relative signal outputs from the four states when reproduction is performed by using a reproducing light beam at $\lambda_1$=443 nm, and FIG. 6 (c) shows relative signal outputs from the four states when reproduction is performed by using a reproducing light beam at 2=780 nm.

FIG. 8 (a) shows two-valued signal arrays to be recorded, FIG. 8 (b) shows a combined signal thereof, FIG. 8 (c) shows a process for synthesizing a modulated signal to be inputted into a magnetic coil from the combined signal shown in FIG. 8 (b), FIG. 8 (d) shows an external magnetic field to be applied to the magneto-optical disk, FIG. 8 (e) shows a light pulse array radiated under the external magnetic field shown in FIG. 8 (d), and FIG. 8 (f) shows a magnetic domain array formed by recording.

FIG. 10 (a) shows a domain array of recording marks having been recorded, FIG. 10 (b) shows magnetization states and two-valued information on the first and second magnetic layers before the second magnetic layer is subjected to rewriting, FIG. 10 (c) shows recording signals used for rewriting, FIG. 10 (d) shows a modulated magnetic field to be applied in accordance with the magnetic field modulation system, and FIG. 10 (e) shows magnetization states and two-valued information on the first and second magnetic layers after rewriting is performed.

FIG. 13 (a) shows recorded magnetization states on the two magnetic layers, FIG. 13 (b) shows relative signal outputs from the four states when reproduction is performed by using a reproducing light beam at $\lambda_1$=443 nm, and FIG. 13 (c) shows relative signal outputs from the four states when reproduction is performed by using a reproducing light beam at $\lambda_2$=780 nm.

FIG. 14 (a) shows two-valued information recorded on the first and second magnetic layers, FIG. 14 (b) shows recording domains, FIG. 14 (c) shows magnetization states and two-valued information recorded on the first and second magnetic layers, FIG. 14 (d) shows a signal reproduced by using a reproducing light beam at $\lambda_2$=780 nm, FIG. 14 (e) shows a signal reproduced by using a reproducing light beam at $\lambda_1$=443 nm, FIG. 14 (f) shows a two-valued signal obtained by slicing the signal shown in FIG. 14 (d) with S1, FIG. 14 (g) shows a two-valued signal obtained by slicing the signal shown in FIG. 14 (d) with S2, FIG. 14 (h) shows a two-valued signal obtained by slicing the signal shown in FIG. 14 (e) with S3, and FIG. 14 (i) shows a two-valued signal obtained by calculation in accordance with (g)−(h)+ (f).

FIG. 15 (a) shows two-valued information recorded on the first and second magnetic layers, FIG. 15 (b) shows recording domains, FIG. 15 (c) shows magnetization states and two-valued information recorded on the first and second magnetic layers, FIG. 15 (d) shows a signal reproduced by using a reproducing light beam at $\lambda_2$=780 nm, FIG. 15 (e) shows a signal reproduced by using a reproducing light beam at $\lambda_1$=443 nm, FIG. 15 (f) shows a two-valued signal obtained by slicing the signal shown in FIG. 15 (d) with S1, FIG. 15 (g) shows a two-valued signal obtained by inverting the signal shown in FIG. 15 (f), and FIG. 15 (h) shows a two-valued signal obtained by slicing the signal shown in FIG. 15 (e) with S2.

FIG. 16 (a) and (b) show the four-valued recording signal, FIG. 16 (c) shows a recording domain array, and FIG. 16 (d) shows a reproduced signal.

FIG. 17 (a) shows the signal level with respect to the external magnetic field concerning a magnetic layer (second recording layer) to which an auxiliary magnetic layer is added, and FIG. 17 (b) shows the signal level with respect to the external magnetic field concerning a first recording layer.

BEST MODE FOR CARRYING OUT THE INVENTION

Embodiments of the magneto-optical recording medium of the present invention and the method for recording and reproduction thereon will be explained in detail below with reference to the drawings.

First Embodiment

First Embodiment of Magneto-optical Recording Medium

In this embodiment, a magneto-optical disk having two magnetic layers was produced, in which four-valued recording of "0", "1", "2", "3" and reproduction thereof were possible on the basis of a magnitude of a magnetic field applied in accordance with the magnetic field modulation system. At first, a transparent substrate made of polycarbonate including a guide groove and a preformat signal formed thereon was produced by installing a stamper to an injection molding machine, and injection-molding a polycarbonate material. Rrespective layers were stacked on the obtained polycarbonate substrate by using a continuous sputtering apparatus provided with a plurality of sputtering film formation chambers. An argon gas or an argon/nitrogen mixed gas was used as an atmosphere gas for sputtering. The substrate was placed in a first film formation chamber. A first dielectric layer composed of SiN having a refractive index of 2.1 was formed as a film having a thickness of 100 nm on the substrate by using SiN as a sputtering target, and using an $Ar/N_2$ mixed gas having a partial pressure of $N_2$ of 10% as a sputtering gas at a pressure of 0.3 Pa. Next, the substrate was transported to a second film formation chamber. A first magnetic layer having a composition of $Tb_{22}Fe_{68}Co_{10}$ was formed as a film having a thickness of 15 nm under an Ar gas pressure of 0.3 Pa by using a TbFeCo alloy as a target. Next, the substrate was transferred to a third film formation chamber. A second dielectric layer composed of SiN having a thickness of 10 nm on the magnetic layer was obtained by forming a film of SiN under the same sputtering condition as that used in the formation of the first dielectric layer. Next, in a fourth film formation chamber, a second magnetic layer having a composition of $Tb_{31}Fe_{58}Co_{11}$ as formed as a film having a thickness of 35 nm under an Ar gas pressure of 0.3 Pa by using a TbFeCo alloy as a target again. The substrate was transported to a fifth film formation chamber. An auxiliary magnetic layer composed of $Pt_{90}Co_{10}$ was formed as a film having a thickness of 50 nm by using a PtCo alloy as a sputtering target, and using an Ar gas as a sputtering gas at a pressure of 0.3 Pa. In a sixth film formation chamber, a third dielectric layer composed of Si having a thickness of 100 nm on the magnetic layer was obtained by forming a film of SiN under the same sputtering condition as that used in the formation of the first dielectric layer. The stacked polycarbonate substrate was taken out of the sputtering apparatus. A UV-curable protective resin was spin-coated on the uppermost layer of the substrate to form a protective film.

Figure 1:
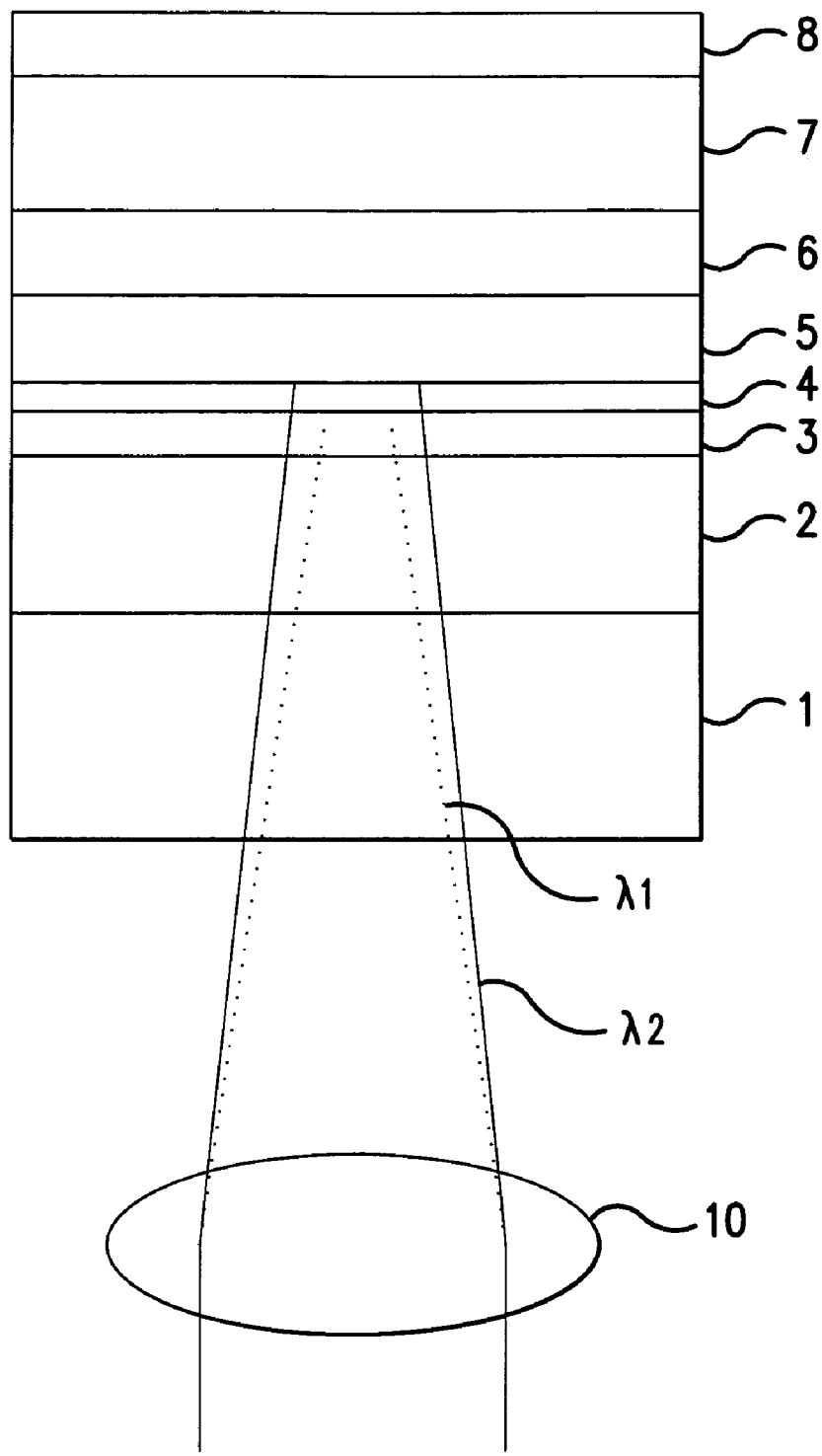
FIG. 1 shows an outline of a cross-sectional structure of a magneto-optical disk of the present invention produced in the first embodiment, illustrating a state in which the disk is irradiated with two reproducing light beams having different wavelengths $\lambda_1$ and $\lambda_1$.

As shown in FIG. 1, the magneto-optical disk thus obtained had a structure comprising the polycarbonate substrate 1 on which the first dielectric layer 2 composed of SiN, the first magnetic layer 3 composed of $Tb_{22}Fe_{68}Co_{10}$, the second dielectric layer 4 composed of SiN, the second magnetic layer 5 composed of $Tb_3 Fe_{58}Co_{11}$, the auxiliary magnetic layer 6 composed of $Pt_{90}Co_{10}$, the third dielectric layer 7 composed of SiN, and the UV-curable protective resin 8 were stacked. FIG. 1 conceptually shows optical paths of two laser beams having two different wavelengths $\lambda_1$ and $\lambda_2$ respectively radiated through a collective lens 10 upon reproduction.

In the obtained magneto-optical disk, the first magnetic layer had a TM-rich composition having a Curie temperature Tc of 230° C., and the second magnetic layer had a RE-rich composition having a Curie temperature Tc of 220° C. Both of the second and third dielectric layers had a refractive index of 2.1 which was the same as that of the first dielectric layer.

The magneto-optical disk described above conforms a structure of a magneto-optical recording medium described by the present inventors in Japanese Patent Application laid-open No. 8-129,784 and K. Shimazaki, M. Yoshihiro, O. Ishizaki, S. Ohnuki, and N. Ohta, "Magnetic multi-valued magneto-optical disk", Magneto-Optical Recording Int. Symp.1994, Post Dead Line Paper Technical Digest, No.27-S-01,p. 4, 1994; Optical Data Storage, Technical Digest, pp. 59–60, 1994. The structure of a magneto-optical recording medium of this type will be briefly explained below with reference to FIG. 17, in relation to the principle of multi-valued recording and reproduction. The magneto-optical recording medium shown in FIG. 17, which basically has a structure equivalent to that of the magneto-optical recording medium shown in FIG. 1, has at least two or more magnetic layers 3, 5 stacked on a substrate 1. At least one of the magnetic layers is formed by using a magneto-optical recording film in which recording states lie in two or more different magnetic field regions with respect to external magnetic fields to be applied. The other magnetic layer or layers are formed by using a magneto-optical recording film in which at least one or more recording states lie in magnetic field region or regions different from those for the aforementioned magnetic layer.

A second recording layer comprises the amorphous vertically magnetizable film 5 to which an auxiliary magnetic layer 6 provided adjacent thereto is added, the amorphous vertically magnetizable film 5 comprising an amorphous alloy of a rare earth metal-transition metal system in which the sub-lattice magnetic moment of rare earth metal is dominant in a temperature range from room temperature to Curie temperature, or in a temperature range from room temperature to a maximum achievable temperature upon recording or erasing.

Figure 17A:
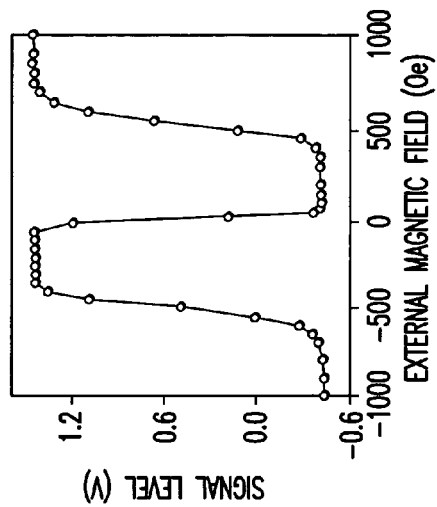
FIG. 17 shows magnetic characteristics of respective recording layers of the magneto-optical recording medium of the present invention, and the recording principle thereon.
Figure 17B:
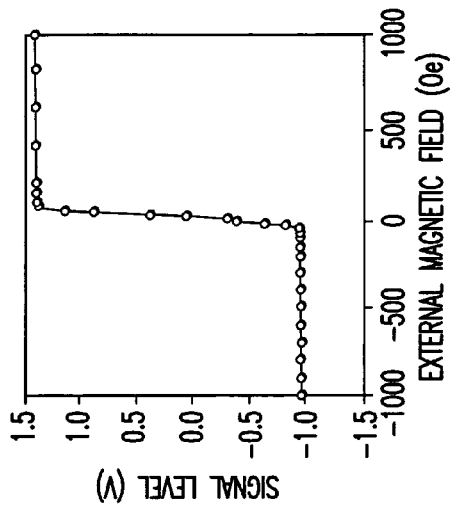
Figure 17:
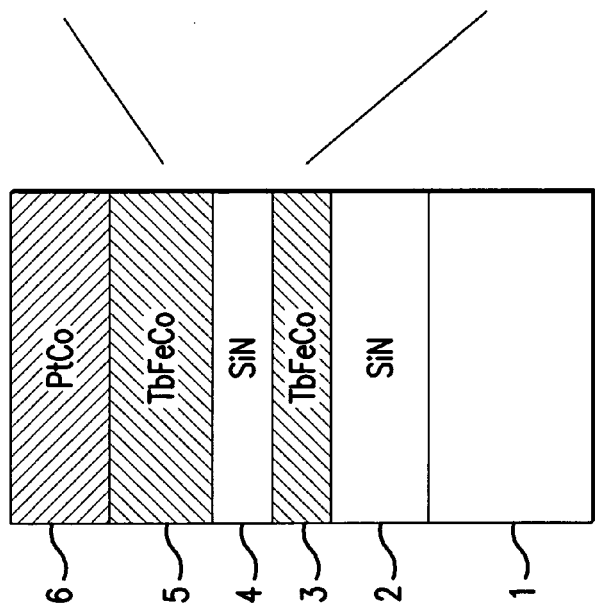

As for the auxiliary magnetic layer 6, the vertical magnetic anisotropic energy is equal to or smaller than that of form anisotropy depending on its composition. Accordingly, the magnetization can be directed to an intra-plane direction (direction parallel to a film plane of the auxiliary magnetic layer 6) before application of an external magnetic field. When the auxiliary magnetic layer 6 thus adjusted is heated to a temperature in the vicinity of the Curie temperature, and an external magnetic field is applied thereto, then the direction of magnetization is raised from the intra-plane direction to generate a magnetic moment component in a direction of the external magnetic field, exerting a communication coupling force on the magnetic moment of transition metal in the amorphous vertically magnetizable layer 5 stacked in contact with the auxiliary magnetic layer 6. Therefore, the second recording layer, which is constructed by stacking the amorphous vertically magnetizable layer 5 and the auxiliary magnetic layer 6, provides two peaks for the change in recording signal level with respect to the external magnetic field as shown in FIG. 17 (a).

The first recording layer 3 is constructed by using a magneto-optical recording film in which at least one or more recording states lie in magnetic field region or regions different from those for the second recording layer (5, 6). Therefore, the first recording layer can be constructed by using only one magnetic film in which one recording state lies in a magnetic field region different from those for the second recording layer (5, 6) as shown in FIG. 17 (b). Alternatively, the first recording layer to be used may be one comprising the same types of an amorphous vertically magnetizable film and an auxiliary magnetic film as those of the second recording layer (5, 6), in which two recording states lie in magnetic field regions different from those for the second recording layer (5, 6).

Figure 3A:
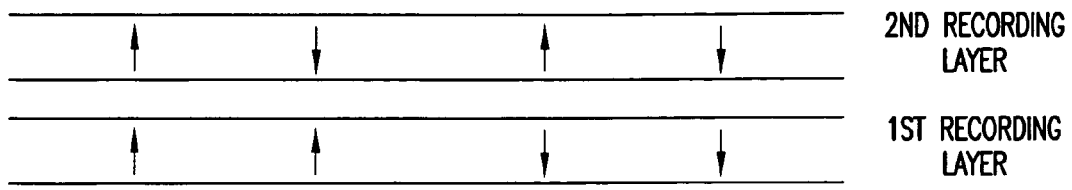
FIG. 3 shows a graph illustrating relative signal outputs concerning the four states determined by the combination of magnetization states of two magnetic layers of the magneto-optical disk obtained in the first embodiment.
Figure 3B:
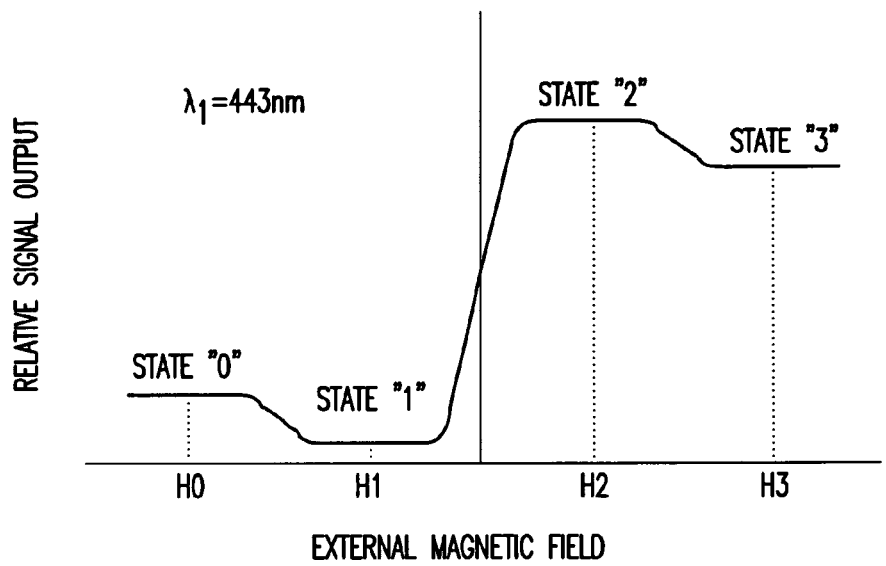
Figure 3C:
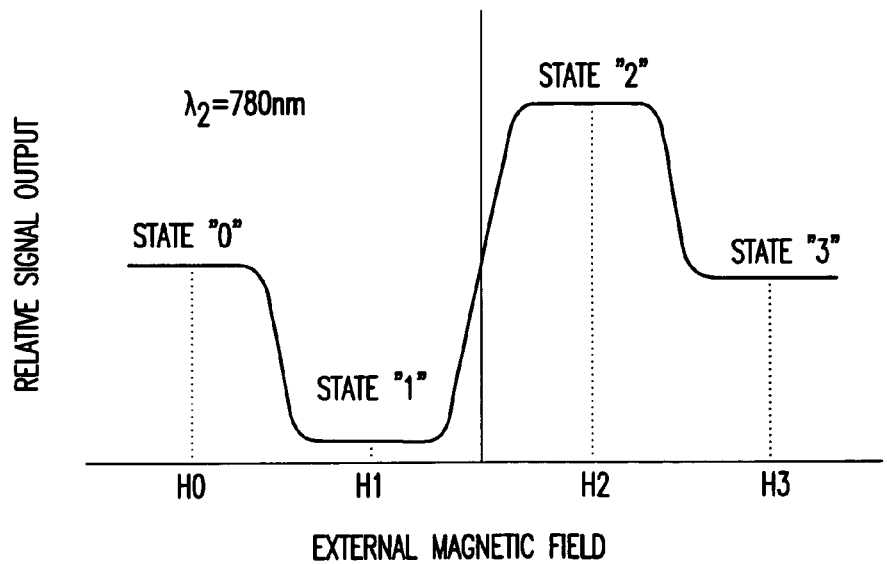
Figure 6A:
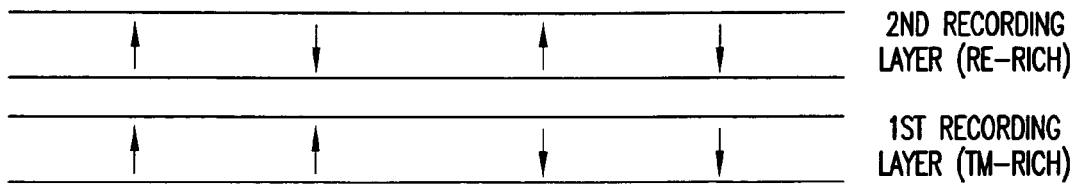
FIG. 6 shows a graph illustrating relative signal outputs concerning the four states determined by the combination of magnetization states of two magnetic layers of the magneto-optical disk obtained in the second embodiment.
Figure 6B:
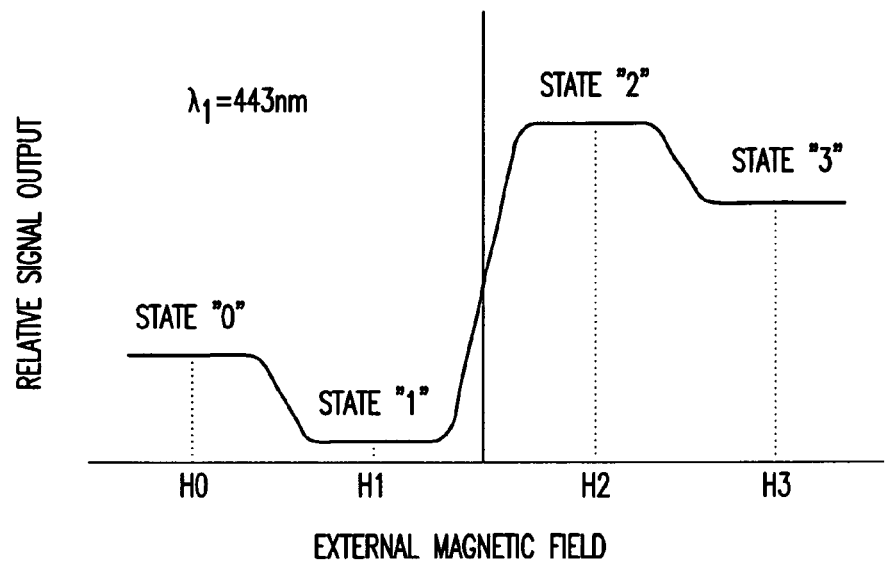
Figure 6C:
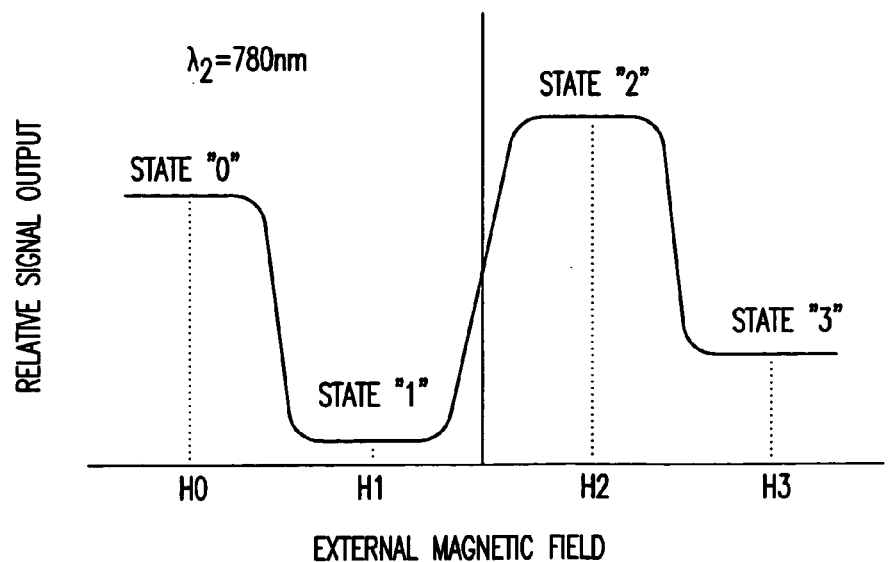

Magnetization states as shown in FIG. 3 (a) and FIG. 6 (a) can be formed in conformity with an external magnetic field to be applied during recording on the basis of a recording method described in the fourth embodiment by using the magneto-optical recording medium constructed to have the recording magnetic field characteristic as described above.

The magneto-optical disk obtained in this embodiment is applicable to a reproducing method described later on, in which multi-valued information can be reproduced by using two light beams having different wavelengths of $\lambda_1$=443 nm and $\lambda_2$=780 nm. By using the reproduction principle as explained in the section of the explanation for the method for recording and reproduction according to the first aspect of the present invention, a reproduction signal is separated into two-valued (binary) values concerning states "0" or "1" and "2" or "3" with a reproducing light beam at $\lambda_1$, and two two-valued signal arrays concerning "0" or "3" and "1" and "2" are obtained with a reproducing light beam at $\lambda_2$. After that, these two-valued signals are subjected to logical operation, and thus recorded four-valued information can be reproduced at a high S/N ratio.

Figure 7:
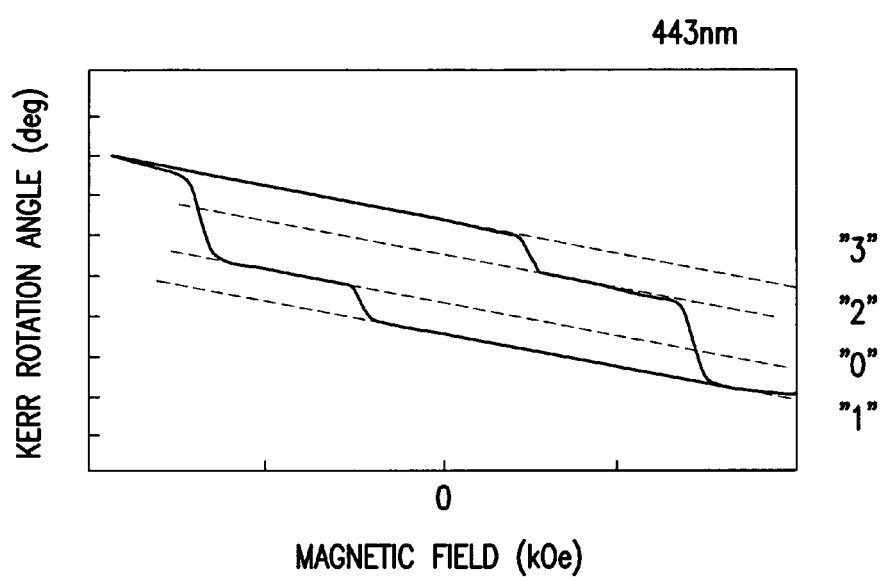
FIG. 7 shows a graph illustrating hysteresis which represents the relationship between the magnetic field applied to the magneto-optical disk obtained in the first embodiment and the Kerr rotation angle detected by using a measuring light beam at $\lambda_1$=443 nm.

FIG. 7 shows a Kerr hysteresis curve which illustrates the change of the Kerr rotation angle with respect to the intensity of an external magnetic field applied to the recording film of the magneto-optical disk. In FIG. 7, the wavelength of a light beam used for the measurement is $\lambda_1$=443 nm. Kerr rotation angles for the respective states of "0", "1", "2", "3" when the external magnetic field is zero indicate apparent remaining Kerr rotation angles. Signals corresponding to the remaining Kerr rotation angles are obtained upon reproduction. The curve, which expresses the magnitude of the Kerr rotation angle in each of the magnetization states with respect to the reproducing wavelength in FIG. 2 used to explain the principle of the reproducing method, is depicted by preparing Kerr hysteresis curves as shown in FIG. 7 with reproducing light beams having various wavelengths, and using obtained data therefrom.

Second Embodiment

Second Embodiment of Magneto-optical Recording Medium

Figure 4:
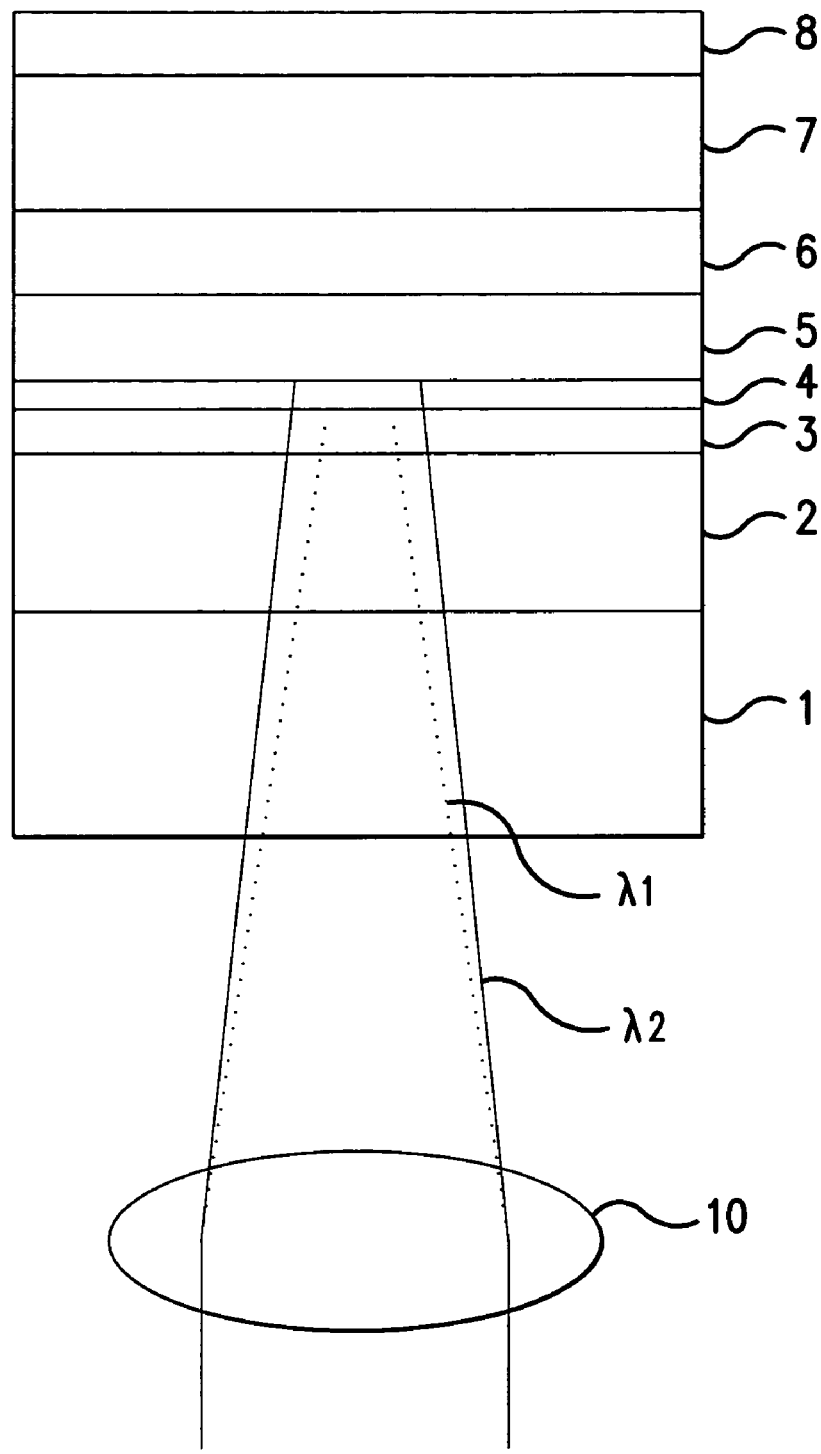
FIG. 4 shows an outline of a cross-sectional structure of a magneto-optical disk of the present invention produced in the second embodiment, illustrating a state in which the disk is irradiated with two reproducing light beams having different wavelengths $\lambda_1$ and $\lambda_2$.

In this embodiment, a magneto-optical disk was produced in the same manner as described in the first embodiment except that the first dielectric layer composed of SiN had a thickness of 60 nm, the first magnetic layer composed of $Tb_{22}Fe_{68}Co_{10}$ had a thickness of 7 nm, the second dielectric layer composed of SiN had a thickness of 7 nm, and the second magnetic layer composed of $Tb_{31}Fe_{58}Co_{11}$ had a thickness of 40 nm so that the state of multiple interference was adjusted. The refractive index of SiN was controlled to be 2.25 by allowing $N_2$ in the $Ar/N_2$ mixed gas to have a partial pressure of 5% during sputtering for the SiN layer. A cross-sectional structure of the obtained magneto-optical disk is shown in FIG. 4.

The magneto-optical disk obtained in this embodiment is applicable to the reproducing method described later on (fifth embodiment) so that information can be reproduced independently from each of the magnetic layers by using two light beams having different wavelengths. By using the reproduction principle as explained in the section of the explanation for the method for recording and reproduction according to the second aspect of the present invention, it is possible to independently reproduce a two-valued magnetization state of the first magnetic layer by employing a reproducing light beam at $\lambda_1$=443 nm, and a two-valued magnetization state of the second magnetic layer by employing a reproducing light beam at $\lambda_2$=780 nm respectively.

Third Embodiment

Third Embodiment of Magneto-optical Recording Medium

Figure 13A:
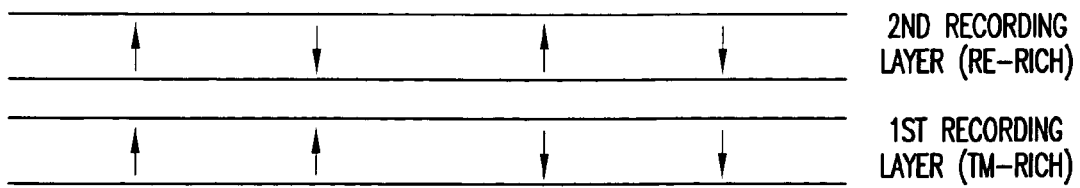
FIG. 13 shows a graph illustrating relative signal outputs concerning the four states determined by the combination of magnetization states of two magnetic layers of the magneto-optical disk obtained in the third embodiment.
Figure 13B:
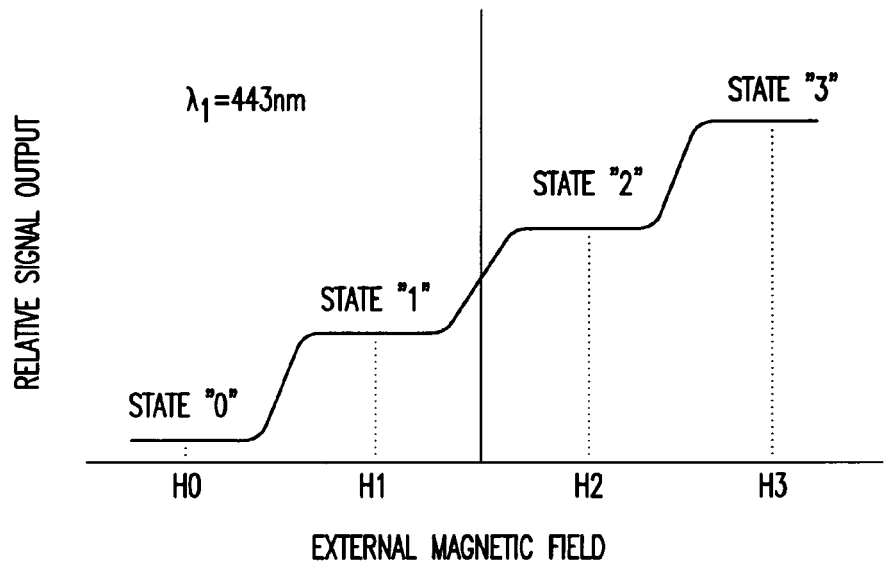
Figure 13C:
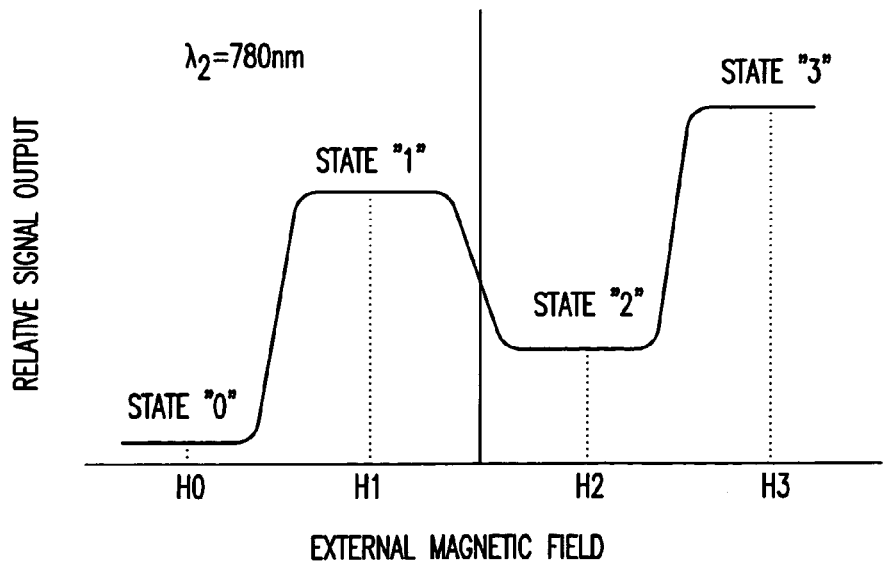

A magneto-optical disk was produced in the same manner as the magneto-optical disk described in the second embodiment except that the magnetic layer composed of $Tb_{31}Fe_{58}Co_{11}$ having the RE-rich composition used in the second embodiment was used for both of the first and second magnetic layers. A four-valued sample signal was recorded on this magneto-optical disk by applying a magnetic field having four levels of intensities. FIGS. 13 (b) and (c) show relationships among the relative reproduction output, the external magnetic field intensity, and the recorded magnetization states upon reproduction performed at $\lambda_1$=443 nm and $\lambda_2$=780 nm respectively. In the case of reproduction by using a reproducing light beam at $\lambda_2$=780 nm, the signal amplitude decreases in an order of the states "3", "1", "2", "0". However, in the case of reproduction by using a reproducing light beam at $\lambda_1$=443 nm, the signal amplitude decreases in an order of the states "3", "2", "1", "0". Such a difference in the order of magnitudes of reproduction signals between the states makes it possible to carry out the methods for recording and reproduction as described in the sixth and seventh embodiments.

Fourth Embodiment

First Method for Recording on Magneto-optical Recording Medium

Figure 8:
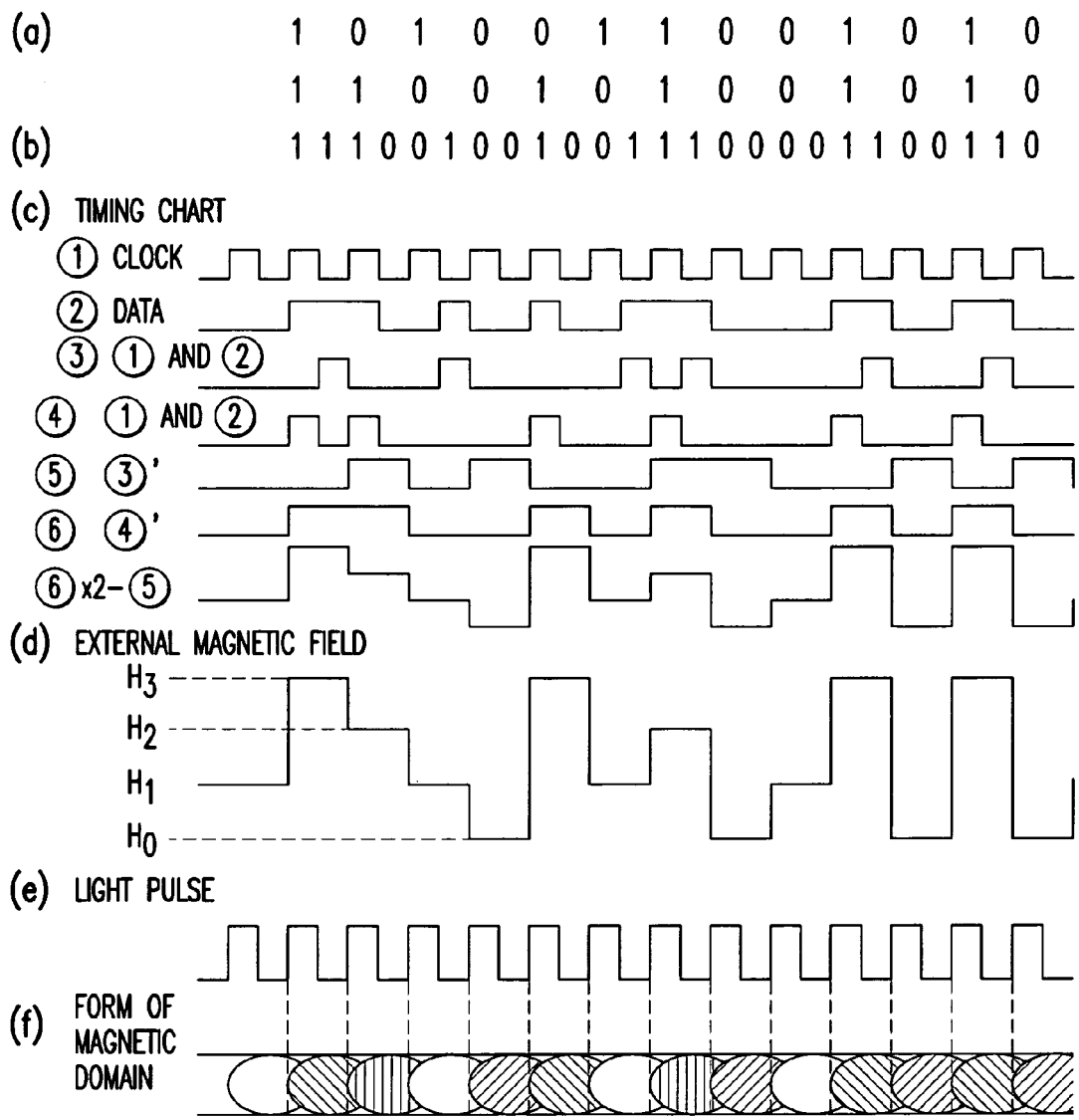
FIG. 8 shows an outline of a recording method in accordance with the magnetic field modulation system used in the fourth embodiment.

In this embodiment, a four-valued signal was recorded in accordance with magnetic field modulation on the magneto-optical disk obtained in the first embodiment by applying an external magnetic field modulated into four levels in conformity with the recording signal while the magneto-optical disk was irradiated with a recording laser beam modulated into a pulse form at a clock period. At first, the magneto-optical disk shown in FIG. 1 was installed to a medium driving unit such as a turn table. An optical head was disposed on a side of the substrate 1, and a magnetic head was disposed on a side of the protective film 7. The medium driving unit was started up. The magneto-optical disk was rotated at a linear velocity of 7.54 m/s with respect to the optical head and the magnetic head, and the optical head and the magnetic head were positioned for a predetermined track subjected to recording. After that, a recording signal as shown in FIG. 8 (*a*) was recorded. A light beam at λ=780 nm radiated from a semiconductor laser was used as a recording laser beam, and the recording power was adjusted to be 9.5 mW to perform recording. 2-Bit signals shown in upper and lower rows in FIG. 8 (*a*) indicate signals to be recorded on the first and second magnetic layers of the magneto-optical disk respectively. Four-valued information was recorded by using a combination of the signals depicted in the upper and lower rows in FIG. 8 (*a*). Every one piece of information on the two rows was combined one by one to provide one signal array as shown in FIG. 8 (*b*). This signal array was subjected to processing in accordance with timing charts shown in FIG. 8 (*c*) to obtain a signal array as shown in the lowermost row in FIG. 8 (*c*). The obtained signal was inputted into the magnetic head in synchronization with a recording clock. Thus four levels of magnetic fields of $H_0$ to $H_3$ as shown in FIG. 8 (*d*) were applied from the magnetic head to the magneto-optical disk. After switching the external magnetic field into a predetermined value, a light pulse as shown in FIG. 8 (*e*) was radiated from the optical head so that a light pulse-irradiated portion of each of the magnetic layers was heated to a temperature at which magnetization could be inverted by the external magnetic field. As a result of the operation as described above, four magnetization states based on the combination of magnetization states of the first and second magnetic layers were formed on each of the light pulse-irradiated portions in conformity with the magnitude of the external magnetic field. A pattern of formed magnetic domains is shown in FIG. 8 (*f*). The four magnetization states are distinguished by motifs affixed to circular marks. Recording based on the four magnetization states can be also performed on the magneto-optical recording media obtained in the second and third embodiment in accordance with the same operation as described above.

Signal modulation for the magnetic field-intensity can be performed by using a system and a signal modulation circuit described in Japanese Patent Application Laid-Open No. 8-129,784 described above. Namely, in the signal modulation circuit, the recording signal is separated into even number bit and odd number bit, followed by waveform processing such as timing adjustment and adjustment for pulse length. After that, the even number bit and the odd number bit are amplified by using amplifiers having different gains respectively, and obtained results are added. Subsequently, the added signal is subjected to voltage-current conversion by using a magnetic head driving circuit. Thus the external magnetic field is applied from the magnetic head. Alternatively, another signal modulation circuit may be used. Namely, the recording signal is separated into even number bit and odd number bit, followed by waveform processing such as timing adjustment and adjustment for pulse length. After that, the even number bit and the odd number bit are amplified by using amplifiers having an identical gain respectively subsequently, each of the amplified signals is subjected to voltage-current conversion by using different magnetic head driving circuits. Thus the external magnetic field is applied from a magnetic head having a plurality of coils. It is of course possible to use other magnetic field generating units such as an electromagnetic coil instead of the magnetic head. Further alternatively, two magnetic heads each having one coil are closely arranged so that the external magnetic field is applied from each of the magnetic heads.

In the signal recording in accordance with the magnetic field intensity modulation system described above, the laser beam may be radiated at a constant intensity, or it may be radiated periodically or in a pulse form.

Fifth Embodiment

First Method for Reproduction on Magneto-optical Recording Medium

Figure 16:
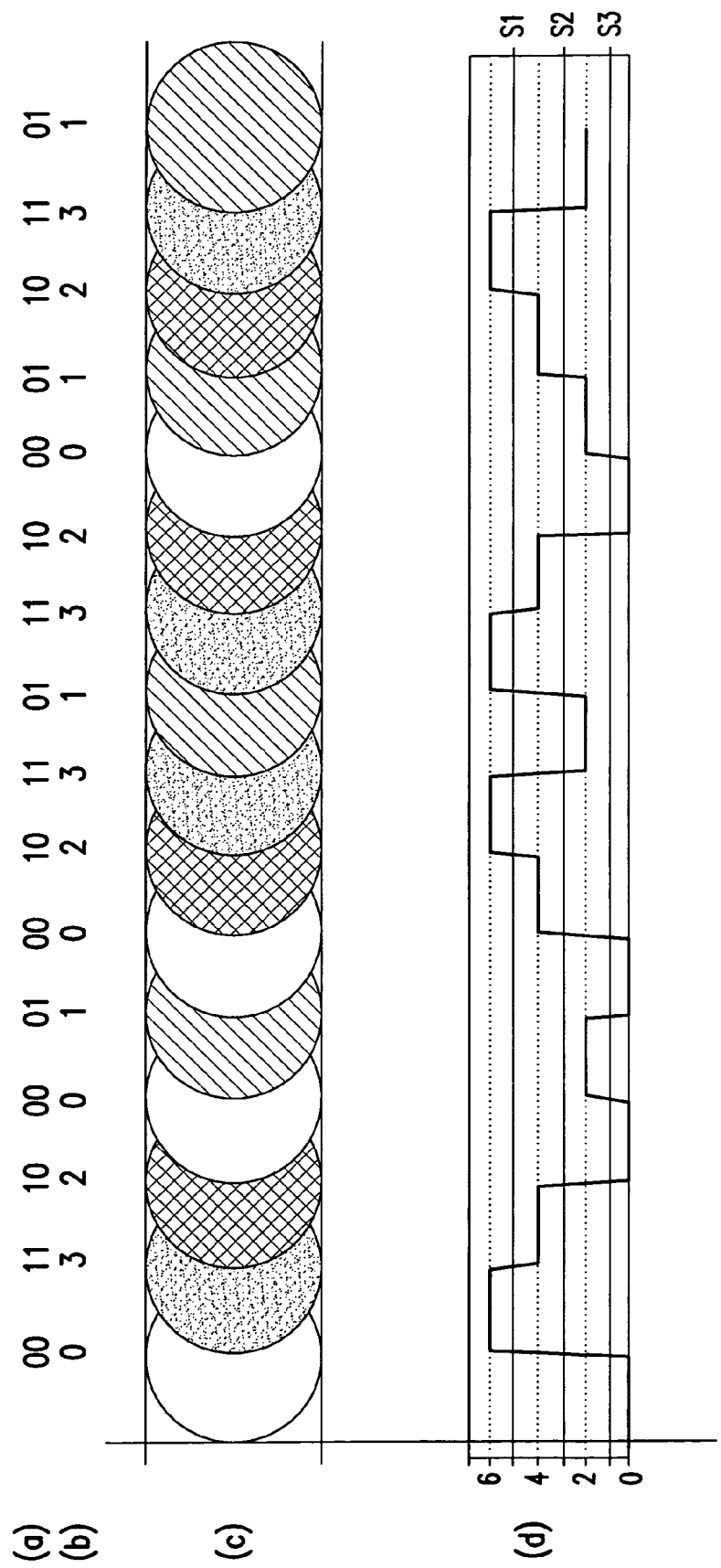
FIG. 16 shows a process of reproduction of a four-valued signal by using a reproducing light beam at a single wavelength.

Next, a method for reproduction on the magneto-optical disk subjected to the four-valued recording in the fourth embodiment will be explained. FIG. 16 schematically shows a signal recorded on a magneto-optical recording medium having two magnetic layers disclosed by the present applicant in Japanese Patent Application laid-open No. 8-129,784 and K. Shimazaki, M. Yoshihiro, O. Ishizaki, S. Ohnuki, and N. Ohta, "Magnetic multi-valued magneto-optical disk", Magneto Optical Recording Int. Symp.1994, Post Dead Line Paper Technical Digest, No.27-S-01,p. 4, 1994; Optical Data Storage, Technical Digest, pp. 59–60, 1994, and a reproduction system therefor. In this system, an array of a four-valued recording signal as shown in FIG. 16 (*a*) and (*b*) is recorded in accordance with the recording method as described above to form recording magnetic domains distinguished by four of motifs as shown in FIG. 16 (*c*). In this technique, a combination of a stacking structure of the medium and a wavelength of a laser beam is selected so that the spacing between magnitudes of Kerr rotation angles corresponding to four magnetization states is equalized. When information is reproduced from the recording medium, an apparent Kerr rotation angle corresponding to a combination of magnetization of the two magnetic layers is detected. A detected signal is sliced by using levels of S1 to S3 to obtain three two-valued signals. The four-valued recorded signal is reproduced from the obtained two-valued signals. In this method, the maximum amplitude of the reproduction signal is equally divided into three to make distribution of regions for the respective signal levels. Accordingly, the S/N ratio is low. In the present invention, the S/N ratio as obtained in the preceding technique described above is improved by performing reproduction by using the magneto-optical recording medium of the present invention, and using laser beams having different wavelengths.

Figure 2:
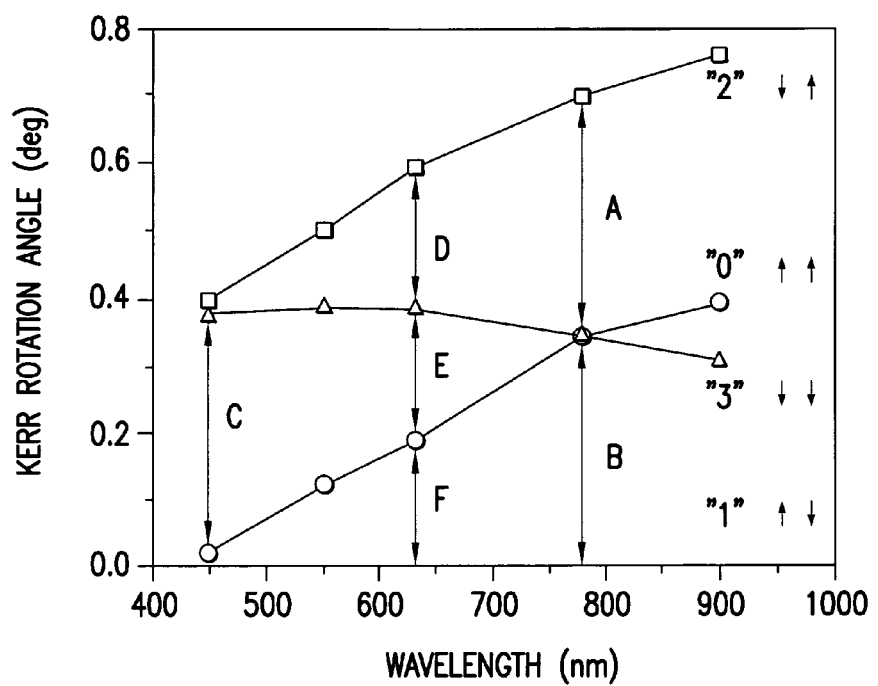
FIG. 2 shows a graph illustrating wavelength-dependency of the apparent Kerr rotation angle concerning four magnetization states determined by the combination of magnetization states of two magnetic layers of the magneto-optical disk obtained in the first embodiment.
Figure 14:
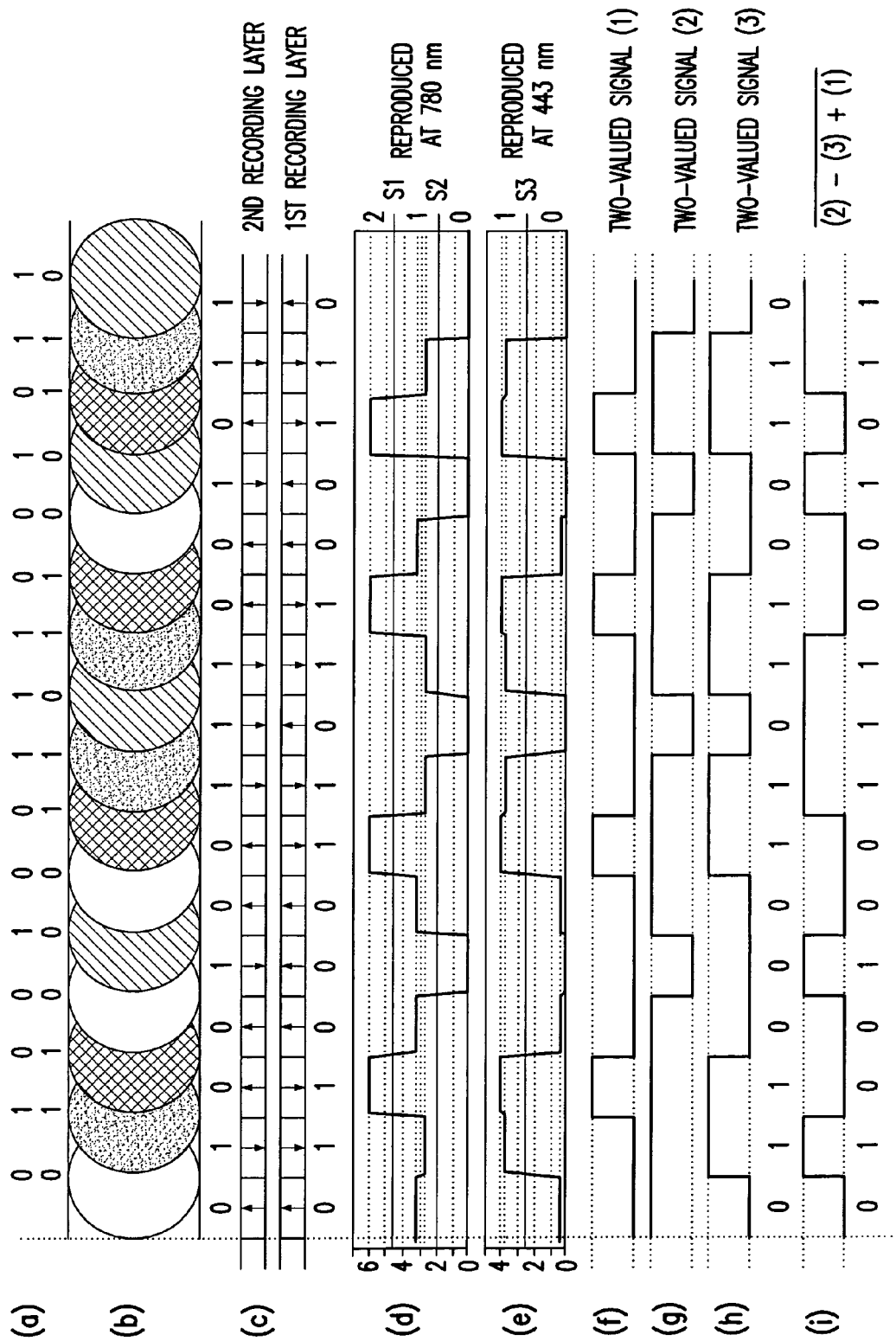
FIG. 14 shows a process of reproduction of information recorded on the first and second magnetic layers in the reproduction method described in the fourth embodiment.

An example, in which four-valued information recorded on the magneto-optical disk of the present invention obtained in the first embodiment was reproduced, will be explained with reference to FIG. 14. Two-valued information composed of two series as illustrated in FIG. 14 (*a*) was recorded in accordance with the recording method described in the fourth embodiment. Information illustrated on the first row in FIG. 14 (*a*) was recorded on the second magnetic layer. Information illustrated on the second row in FIG. 14 (*a*) was recorded on the first magnetic layer. Magnetization states of the respective magnetic layers subjected to recording are shown in FIG. 14 (*c*), and recording marks corresponding to these states are shown in FIG. 14 (*b*). The magneto-optical disk on which such information was recorded was subjected to reproduction by using two laser beams having different wavelengths of $\lambda_1$=443 nm and $\lambda_2$=780 nm. An He-Cd laser was used as a laser source for the wavelength $\lambda_1$, and a semiconductor laser was used as a laser source for the wavelength $\lambda_2$. This recording medium has a signal output characteristic corresponding to each of the magnetization states as shown in FIG. 3 (b) with respect to the reproducing wavelength of $\lambda_1$=443 nm. On the other hand, it has a signal output characteristic corresponding to each of the magnetization states as shown in FIG. 3 (c) with respect to the reproducing wavelength of $\lambda_2$=780 nm. FIG. 2 shows dependency of the apparent Kerr angle (relative signal output) on the reproducing wavelength in a range of wavelength of 443 nm to about 900 nm. A reproduction signal reproduced from this recording medium by using the reproducing light beam at $\lambda_2$=780 nm is shown in FIG. 14 (d). It is assumed that the output level of the reproduction signal from a magnetization state (↑↓) is 0, and the output level of the reproduction signal from a state (↓↑) is 6. The reproduction outputs from states (↑↑) and (↓↓) are approximately at a level 3 which generally divides the spacing between the levels 0 and 6 into two. The spacing between the levels 6 and 3 corresponds to the difference A in the apparent Kerr rotation angle in FIG. 2, and the spacing between the reproduction output levels 0 and 3 corresponds to the difference B in the apparent Kerr rotation angle in FIG. 2. Namely, it is recognizable that the three states can be distinguished by the relatively large difference in signal amplitude by using the reproducing light beam at $\lambda_2$=780 nm. An output for the reproducing light beam at $\lambda_1$=443 nm is shown in FIG. 14 (e). As for levels detected from the four magnetization states, it is assumed that the state (↓↑) is at a level 4, and the state (↑↓) is at a level 0. The output level of the reproduction signal from the state (↓↓) is extremely close to the level of the state (↓↑). The output level of the reproduction signal from the state (↑↑) is extremely close to the 0 level reproduced from the state (↑↓). The difference between the reproduction output levels of 0 and 4 corresponds to the difference C in the apparent Kerr rotation angle in FIG. 2. Therefore, it is recognizable that the two states can be distinguished by the large difference in signal amplitude by using the output for the reproducing light beam at $\lambda_1$=443 nm.

Next, the reproduction signal obtained by using the reproducing light beam at $\lambda_2$=780 nm is sliced by using slice levels of S1 and S2 as shown in FIG. 14 (d). Thus two-valued signal series (designated as (1) and (2) respectively) as shown in FIG. 14 (f) and (g) are obtained. The reproduction signal obtained by using the reproducing light beam at $\lambda_1$=443 nm is sliced by using a slice level of S3 as shown in FIG., 14 (e). Thus a two-valued signal array (designated as (3)) as shown in FIG. 14 (h) is obtained. A logical operation for the signal series (2)–(3)+(1) is performed to obtain a two-valued signal array which is inverted to obtain a signal array as shown in FIG. 14 (i). Thus the recorded signal array on the first row can be reproduced. The recorded signal array on the second row can be reproduced by the signal array shown in FIG. 14 (h), namely the signal array of (3) itself. Therefore, the recorded signals on the first and second rows can be separated, and the four-valued signal composed of the two-valued signals represented by the two arrays can be reproduced at a more excellent S/N ratio as well.

In the embodiment described above, an identical position on the track on the magneto-optical disk is irradiated with the two reproducing laser beams having the different wavelengths. However, radiation may be performed so that different light-collecting positions are provided for the two laser beams. Such a procedure may be dealt with by adjusting a reproducing circuit so that the difference in time caused by a distance between two laser spots is compensated.

Sixth Embodiment

Second Method for Reproduction on Magneto-optical Recording Medium

Figure 5:
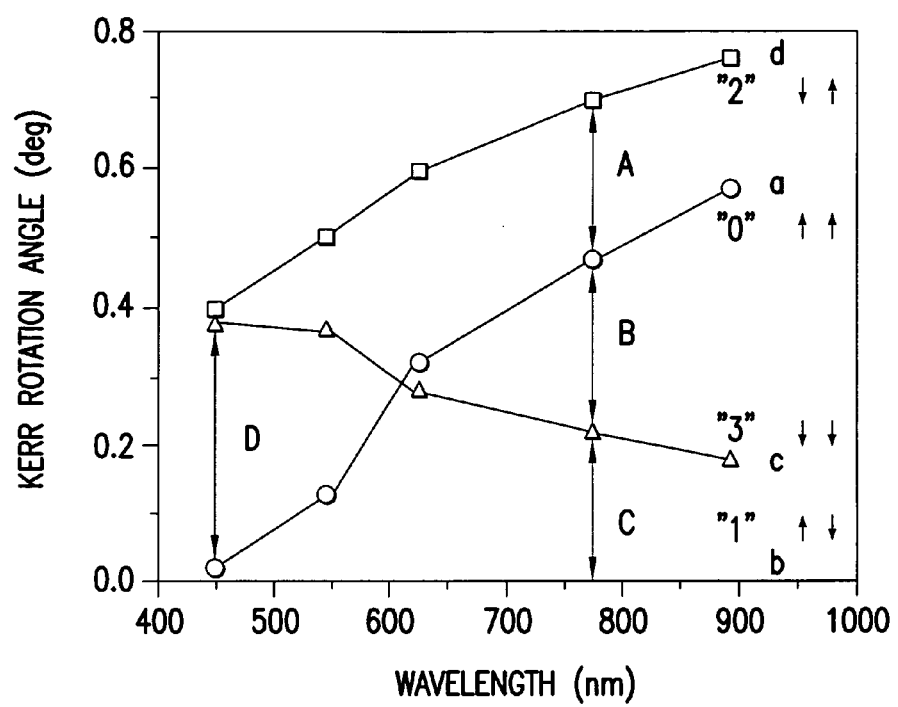
FIG. 5 shows a graph illustrating wavelength-dependency of the apparent Kerr rotation angle concerning four magnetization states determined by the combination of magnetization states of two magnetic layers of the magneto-optical disk obtained in the second embodiment.
Figure 15:
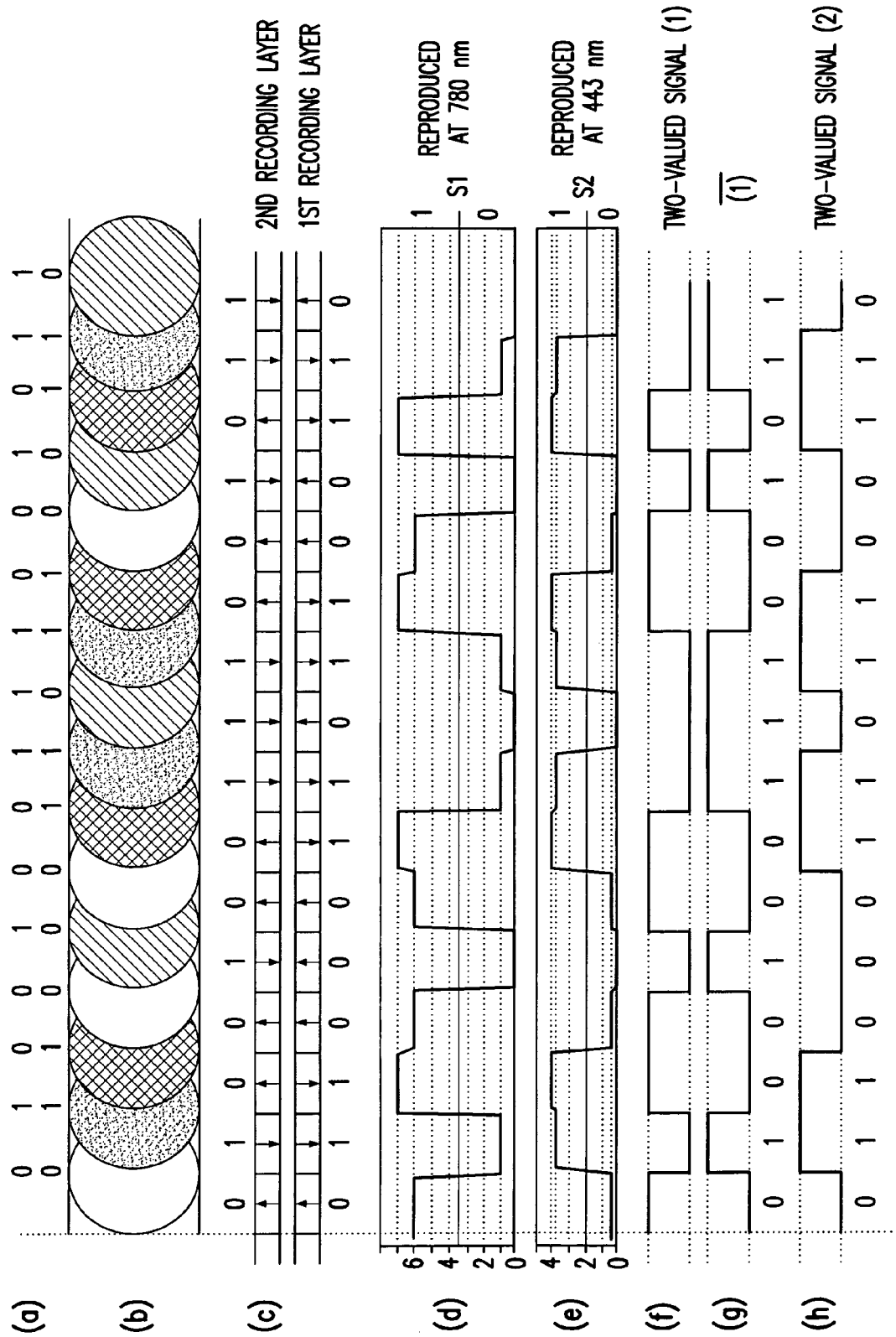
FIG. 15 shows a process of reproduction of information recorded on the first and second magnetic layers in the reproduction method described in the sixth embodiment.

In this embodiment, a reproducing method different from the reproducing method described in the fifth embodiment will be explained. The magneto-optical disk produced in the second embodiment was used as a recording medium. As shown in FIG. 5, the magneto-optical disk produced in the second embodiment has the following magneto-optical characteristic. Namely, a curve, which represents variation in the apparent Kerr rotation angle with respect to the wavelength as detected from one combined magnetization state (determined by two magnetic layers), intersects a curve which represents variation in the apparent Kerr rotation angle with respect to the wavelength as detected from another combined magnetization state, in a range between two reproducing wavelengths $\lambda_1$ and $\lambda_2$. At first, two series of two-valued information as shown in upper and lower rows in FIG. 15 (a) were recorded in accordance with the same method as the recording method used in the first embodiment. Recorded domains are shown in FIG. 15 (b). Each of the domains is distinguished by motifs affixed to circular marks in conformity with the difference in the combined magnetization state between the two magnetic layers. FIG. 15 (c) shows two-valued signals and magnetization states recorded on each of the magnetic layers. The two-valued signals recorded on the two layers as described above were reproduced by using two laser beams having different wavelengths of $\lambda_1$=443 nm and $\lambda_2$=780 nm. FIG. 15 (d) shows a signal waveform obtained by reproduction with the reproducing light beam at $\lambda_2$=780 nm. FIG. 15 (e) shows a signal waveform obtained by reproduction with the reproducing light beam at $\lambda_2$=443 nm.

The reproduction output level with respect to the combination of each of the magnetization states greatly differs owing to the use of the two reproducing wavelengths $\lambda_1$ and $\lambda_2$ because of the following reason. Namely, as understood from the curves illustrating the change in the apparent Kerr rotation angle with respect to the reproducing wavelength shown in FIG. 5, the four states "↓↑", "↑↑", "↓↑", "↑↑" determined by the combination of magnetization states of the first and second magnetic layers involve greatly different magnitudes of the Kerr rotation angle and its order at the wavelengths 780 nm and 443 nm. A two-valued signal(1) as shown in FIG. 15 (f) is obtained by slicing a signal reproduced with the reproducing light beam at $\lambda_2$=780 nm shown in FIG. 15 (d), by using a level S1 at which the maximum signal intensity is divided into two. Further, a two-valued signal(1) shown in FIG. 15 (g) is obtained by inverting a signal waveform of the obtained two-valued signal. It is understood that the two-valued signal(1) shown in FIG. 15 (g) is the same as the two-valued signal recorded on the second magnetic layer. On the other hand, a two-valued signal(2) as shown in FIG. 15 (h) is obtained by slicing a signal reproduced with the reproducing light beam at $\lambda_1$=443 nm shown in FIG. 15 (e), by using a level S2 at which the maximum signal intensity is divided into two. It is understood that the two-valued signal shown in FIG. 15 (h) is the same as the two-valued signal recorded on the first magnetic layer. Therefore, it is understood that the two-valued information recorded on the first magnetic layer can be reproduced by performing reproduction on the magneto-optical disk by using the wavelength $\lambda_1$=443 nm, and the two-valued information recorded on the second magnetic layer can be reproduced by performing reproduction on the magneto-optical disk by using the wavelength $\lambda_2$=780 nm. This reproduction process is based on the following principle. Namely, as explained in the principle of the method for recording and reproduction according to the second embodiment of the present invention, the two states of "↓↑" and "↓↓" can be distinguished from the two states of "↑↑" and "↑↓" by slicing the reproduction signal at the intermediate level of the reproduction signal output at $\lambda_1$=443 nm, and the same signal as the signal obtained by two-valued representation of the magnetization state of the first magnetic layer is obtained by two-valued representation of the two sets of the states. Further, the two states of "↓↑" and "↑↑" can be distinguished from the two states of "↓↓" and "↑↓" by slicing the reproduction signal at the intermediate level of the reproduction signal output at $\lambda_1$=780 nm, and the same signal as the signal obtained by inverting the two-valued signal of the magnetization state of the second magnetic layer is obtained by two-valued representation of the difference between the two sets of the states. Accordingly, pieces of information recorded on a plurality of magnetic layers can be independently reproduced by using the reproduction method described in this embodiment. In addition, a four-valued signal obtained from two two-valued input signal series can be also reproduced at a high S/N ratio in the same manner as described in the fifth embodiment.

Seventh Embodiment

Second Method for Recording on Magneto-optical Recording Medium

In this embodiment, an example will be explained, in which a recording method on a magneto-optical recording medium different from the recording method used in the fourth embodiment was carried out. In this recording method, information on any one of the first and second magnetic layers is rewritten in a virtual manner. In a recording system in which recording is performed by raising the temperature by collecting a laser beam with respect to stacked thin film-shaped magnetic layers included in an optical recording medium, it is extremely difficult to selectively raise the temperature of only one layer up to a temperature capable of recording. For this purpose, for example, an artifice is required to relatively increase the distance between two layers so that focal positions for a laser beam spot are deviated. However, such an artifice is extremely difficult to be carried out because of difficulty to achieve a thermal condition. Thus the present invention proposes the following method. Namely, information on a magnetic layer (for example, first magnetic layer) not subjected to rewriting of information is previously reproduced and stored. Upon rewriting of information, both of the first and second magnetic layers are heated to a laser beam so that the read information is recorded on the first magnetic layer again, and new information is recorded on the second magnetic layer subjected to rewriting. According to this method, apparently the information on the first magnetic layer remains as it is, and only information on the second magnetic layer is rewritten into the new information. Thus only one of the magnetic layers is subjected to rewriting.

Figure 9:
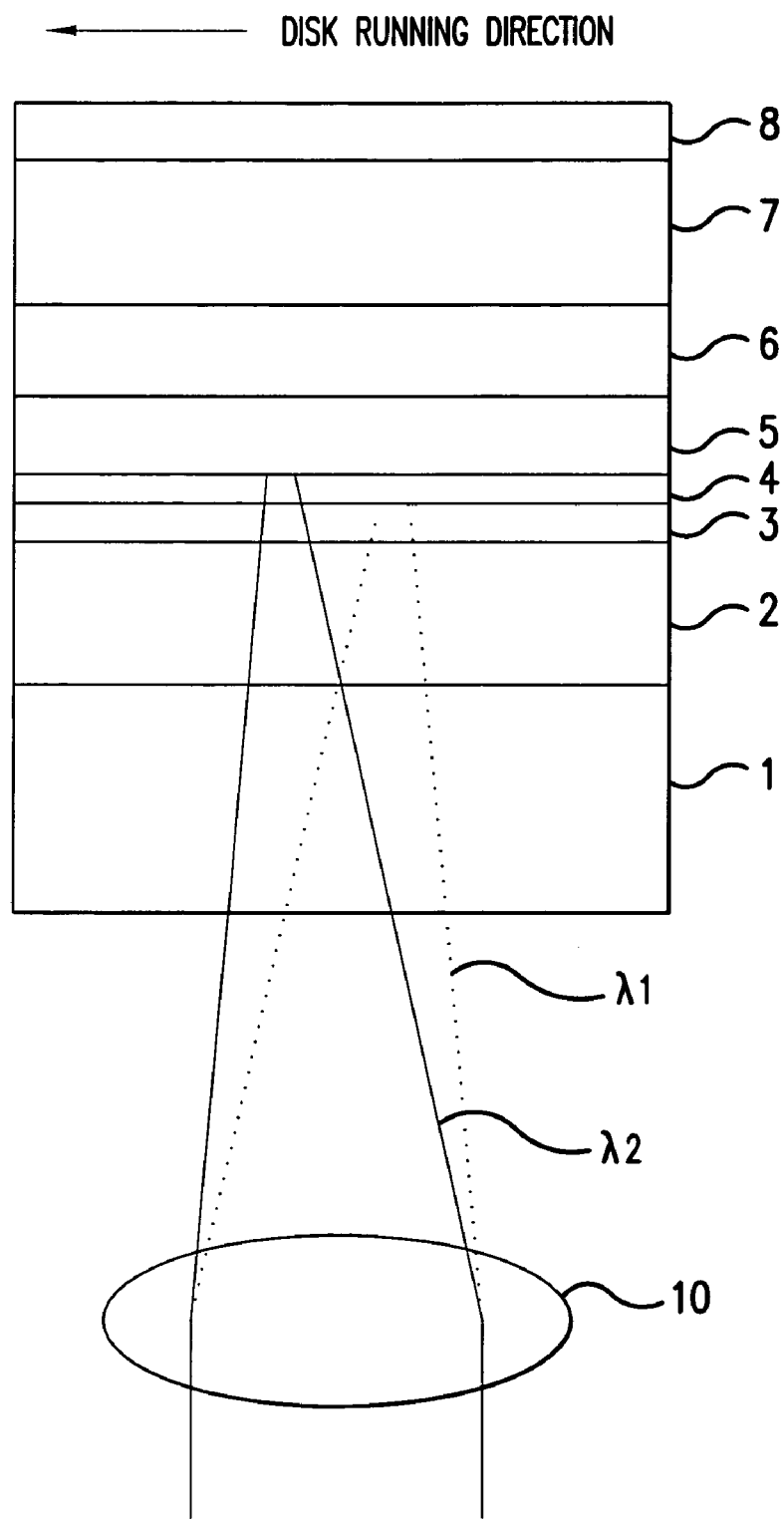
FIG. 9 shows a state in which information on the first layer is reproduced by using a reproducing light beam at $\lambda_1$, while the first and second layers are subjected to recording by using a recording light beam at $\lambda_2$ in a recording method described in the seventh embodiment.
Figure 10:
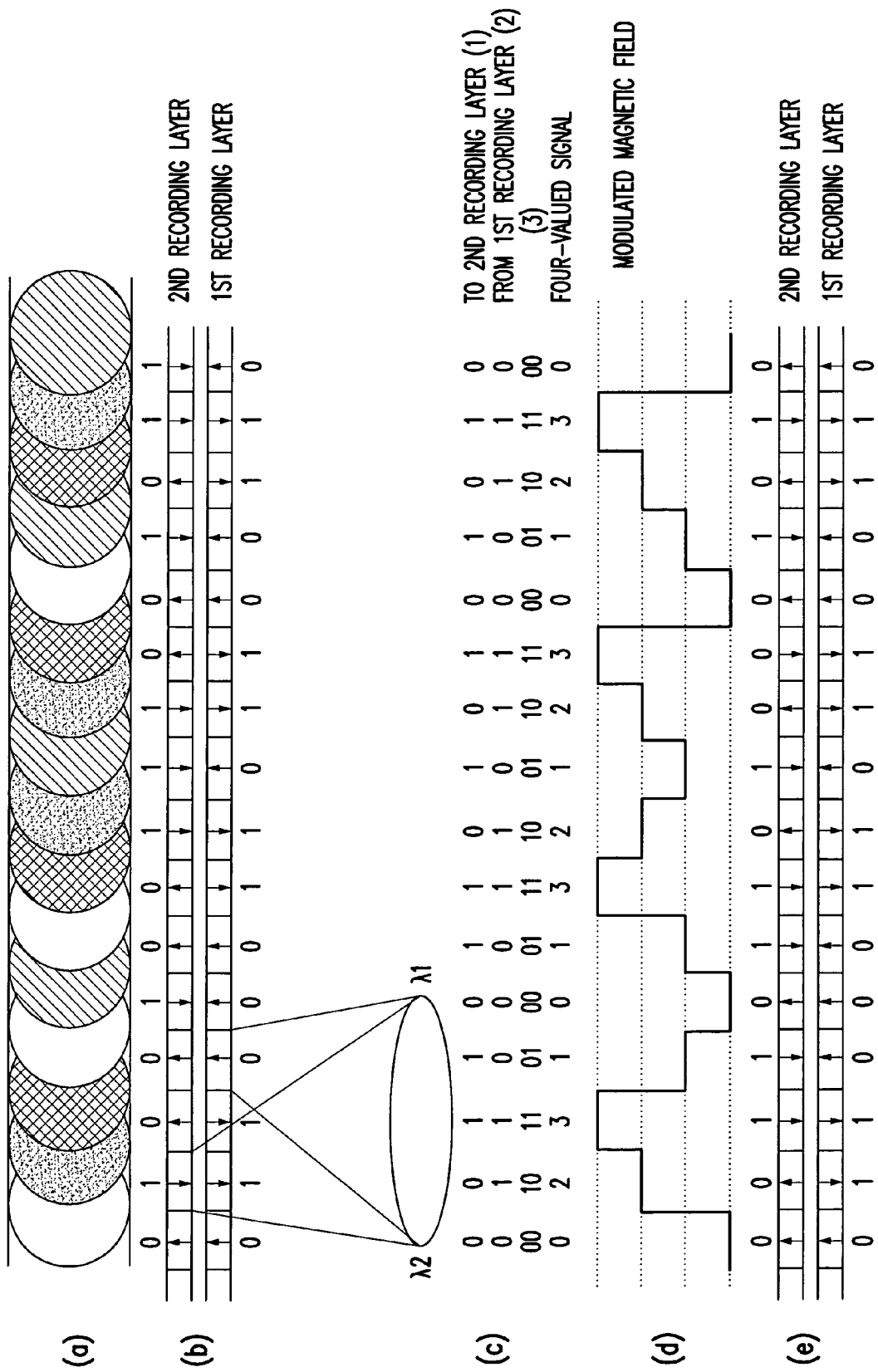
FIG. 10 shows magnetization states of the first and second magnetic layers before and after information on the second magnetic layer is rewritten in the recording method described in the seventh embodiment.
Figure 11:
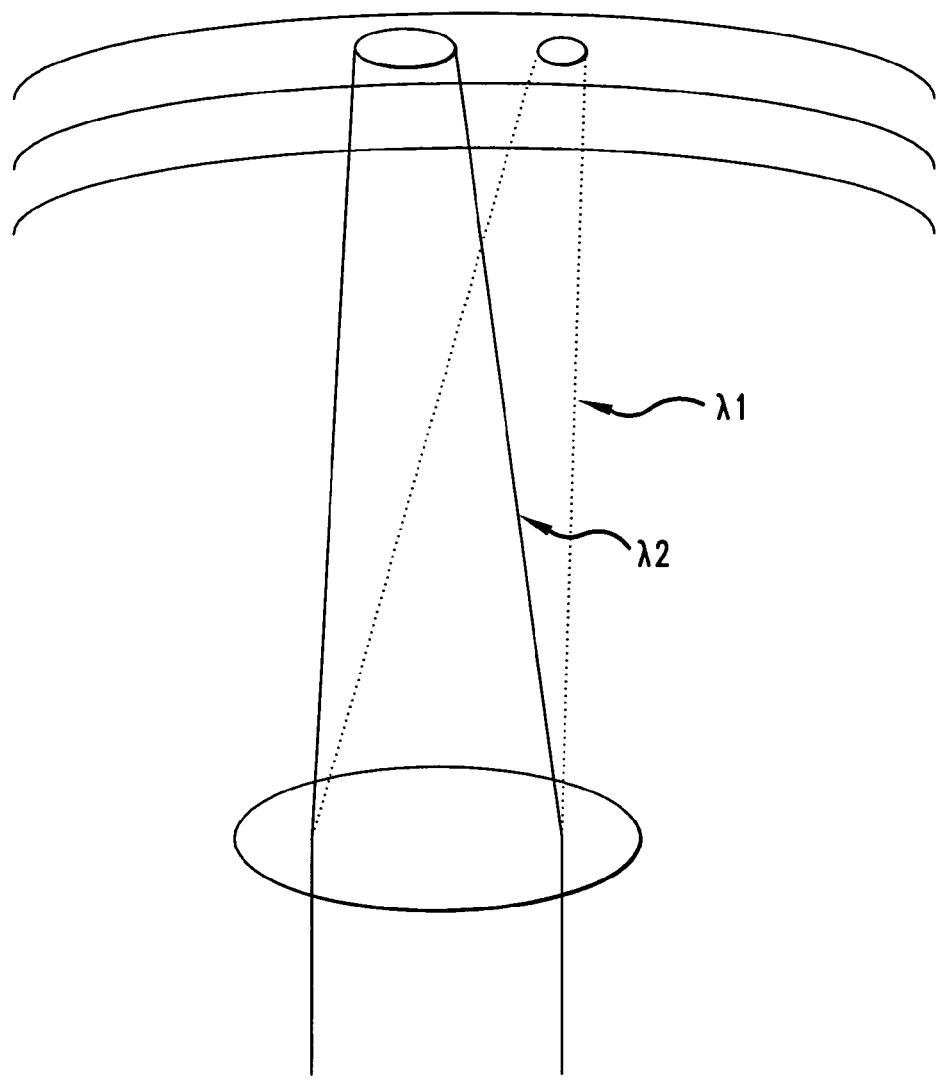
FIG. 11 shows positions irradiated with a reproducing light beam at the wavelength $\lambda_1$ and a recording light beam at the wavelength $\lambda_2$ in the recording method described in the seventh embodiment.
Figure 12:
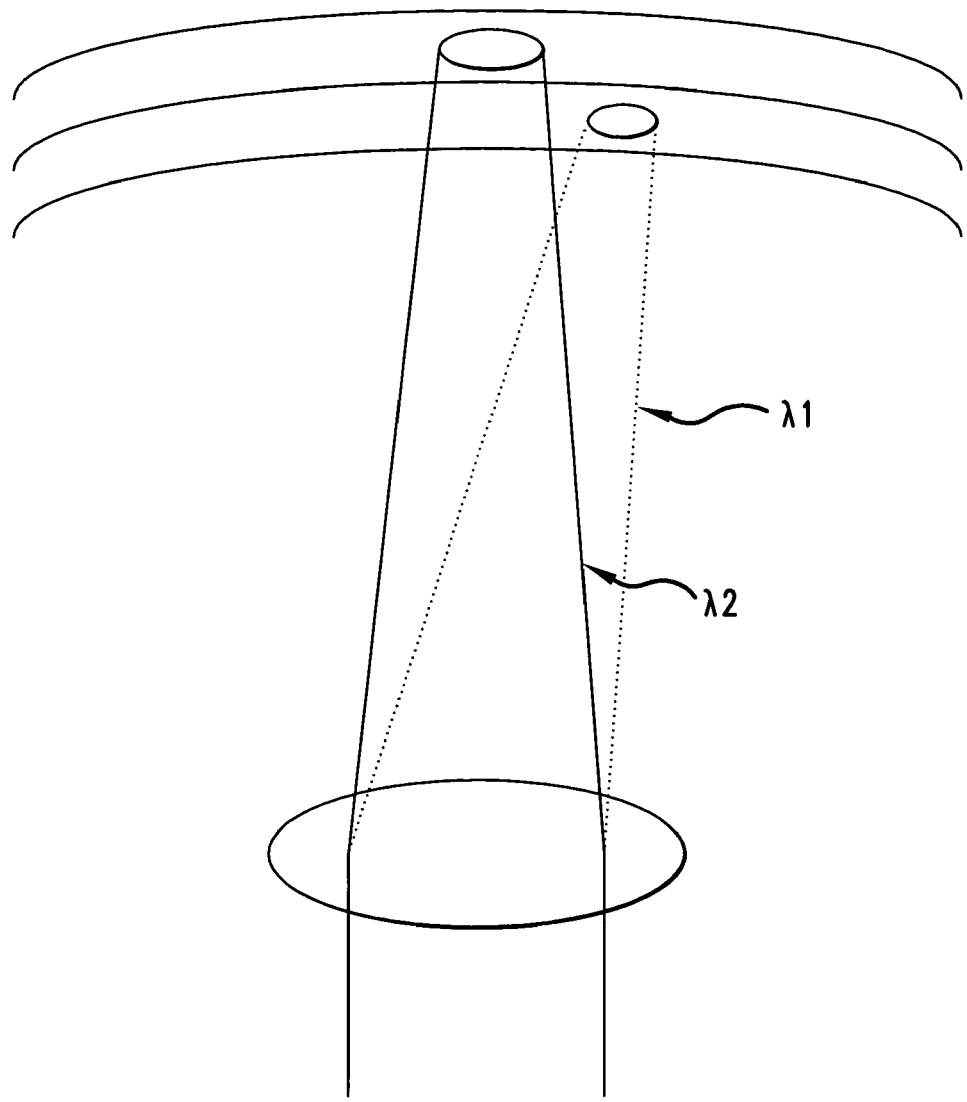
FIG. 12 shows other positions irradiated with a reproducing light beam at the wavelength $\lambda_1$ and a recording light beam at the wavelength $\lambda_2$ in the recording method described in the seventh embodiment.

Next, a specified method will be explained with reference to FIGS. 9 and 10. The magneto-optical disk produced in the second embodiment was used as a recording medium. Accordingly, when the magneto-optical disk is operated in accordance with the reproduction method as explained in the aforementioned sixth embodiment, then information on the first magnetic layer can be reproduced by using the reproducing light beam having the wavelength $\lambda_1$=443 nm, and information on the second magnetic layer can be reproduced by using the reproducing light beam having the wavelength $\lambda_2$=780 nm on the recording medium. Two laser sources as shown in FIG. 9 were used upon recording of information, and two laser beams were collected so that they were deviated from each other at frontward and backward positions in a direction along a recording track. Namely, the laser beam at $\lambda_1$=443 nm was allowed to precede the laser beam at $\lambda_2$=780 nm in order to make scanning on the disk. The laser beam at $\lambda_1$=443 nm was used as a light source for reproduction, and the laser beam at $\lambda_2$=790 nm was used as a light source for recording. It is assumed that magnetization arrays as shown in FIG. 10 (b) are firstly recorded on the two magnetic layers of the magneto-optical disk. Domains corresponding to the magnetization arrays are shown in FIG. 10 (a). The magneto-optical disk having the domains as described above is irradiated with the laser beam at $\lambda_1$, and a two-valued signal(2) (second row in FIG. 10 (c)) is reproduced by detecting a reflected light beam from the disk. The reproduced two-valued signal is temporarily stored in an external memory. The reproduced signal obtained by using the reproducing light beam at $\lambda_1$ corresponds to information on the first magnetic layer. In the next step, the reproduced signal(2) is combined with a two-valued signal (1) subjected to rewriting on the second magnetic layer (uppermost row in FIG. 10 (c)) to obtain a signal(3) (third row in FIG. 10 (c)) so that a modulated waveform of an external magnetic field to be applied is formed (FIG. 10 (d)). When a position of information, at which reproduction has been performed by using the reproducing light beam at $\lambda_1$, is encompassed by the light spot at $\lambda_2$, both of the first and second magnetic layers are heated to a temperature capable of recording. The external magnetic field in conformity with the combined recording signal described above is applied to perform recording on the both magnetic layers. FIG. 10 (e) shows magnetization states of the respective magnetic layers subjected to recording, and two-valued signals recorded thereon. According to the recording method as described above, information on the first magnetic layer is recorded again as it is as original information, and new information is recorded only on the second magnetic layer. The spacing distance between the reproducing light spot at $\lambda_1$ and the recording light spot at $\lambda_2$ is adjusted to be a length more suitable for performance of a temporarily storing circuit for reproduced information and a magnetic field modulating circuit. As for the positions of the spots of the two irradiating-beams, they may be located at frontward and backward positions on an identical track as shown in FIG. 11. Alternatively, they may be located on adjacent recording tracks as shown in FIG. 12 so that reproduced information obtained by using the wavelength $\lambda_1$ is temporarily stored in a memory during a period in which a recording light beam spot at the wavelength $\lambda_2$ circulates the track.

In the recording method described above, only the information on the second magnetic layer is rewritten. However, when only the information on the first magnetic layer is rewritten, rewriting of the information on the first magnetic layer can be executed by using the laser beam at the wavelength $\lambda_2$ and the laser beam at the wavelength $\lambda_1$ as a reproducing light beam and a recording light beam respectively to make scanning so that the laser spot at the wavelength $\lambda_2$ precedes the laser spot at the wavelength $\lambda_1$.

In the sixth and seventh embodiment described above, recording and reproduction are performed by using the magneto-optical disk obtained in the second embodiment. However, it is also allowable to use the magneto-optical disk obtained in the third embodiment. When the magneto-optical disk obtained in the first embodiment is used, it is impossible to reproduce information on one of the magnetic layers by using only the reproducing light beam having one of the wavelengths. Accordingly, information on both of the layers is once reproduced by using the reproducing light beams having the wavelengths $\lambda_1$ and $\lambda_2$. Only information on one of the magnetic layers is stored, which is combined with information to be recorded on the other magnetic layer, followed by recording by using the recording light beam. Thus it is possible to execute a recording method in which only one of the layers is subjected to rewriting.

Eighth Embodiment

Fourth Embodiment of Magneto-optical Recording Medium

In the aforementioned embodiments, the rare earth metal-transition metal alloy comprising the same components (TeFeCo) has been used for the first and second magnetic layers. On the contrary, this embodiment exemplifies a magneto-optical recording medium produced by using different materials for the first and second magnetic layers. The magneto-optical recording medium of the present invention conforms to a structure of a magneto-optical recording medium described in Japanese Patent Application laid-open No. 8-129,784 and K. Shimazaki, M. Yoshihiro, O. Ishizaki, S. Ohnuki, and N. Ohta, "Magnetic multi-valued magneto-optical disk", Magneto-Optical Recording Int. Symp.1994, Post Dead Line Paper Technical Digest, No.27-S-01,p. 4, 1994; Optical Data Storage, Technical Digest, pp. 59–60, 1994, proposed by the present inventors. This magneto-optical recording medium includes at least two or more stacked magnetic layers. Of the respective magnetic layers, at least one magnetic layer is formed of a magneto-optical recording film in which recording states exist in two or more different magnetic field regions with respect to an applied external magnetic field, and the other magnetic layer or layers are formed of a magneto-optical recording film in which at least one or more recording states exist in magnetic field regions different from those for the aforementioned magnetic layer. As described in Japanese Patent Application laid-open No. 8-129,784 and K. Shimazaki, M. Yoshihiro, O. Ishizaki, S. Ohnuki, and N. Ohta, "Magnetic multi-valued magneto-optical disk", Magneto-Optical Recording Int. Symp.1994, Post Dead Line Paper Digest Technical, No.27-S-01,p. 4, 1994; Optical Data Storage, Technical Digest, pp. 59–60, 1994, materials for the magnetic layer applicable to the medium include, for example, oxide magnetic substances such as garnet and ferrite, alternately stacked materials composed of noble metal such as Pt and Pd and transition metal such as Fe and Co and/or rare earth metal such as Tb and Gd, Heuslar alloys such as PtMnSb, and other materials having a large magneto-optical effect and usable to form a thin film such as MnBi. A specified example of the medium constructed as described above will now be explained.

When a multi-layered recording medium, obtained by forming multiple layers by using only a rare earth metal-transition metal alloy, is subjected to reproduction by using a plurality of laser beams having different wavelengths so that pieces of information on respective recording layers are distinguished, then the mutual difference in the Kerr rotation angle between respective recording magnetization states with respect to the respective reproducing wavelength is generated by only a condition of optical multiple interference, because of the following reason. Namely, since materials of the same type are used for the recording layers, the materials themselves do not provide a large change for their tendency of change in the Kerr rotation angle with respect to the reproducing wavelength. Accordingly, in order to increase the difference in the Kerr rotation angle between respective recording magnetization states with respect to the reproducing wavelength and enhance the S/N ratio of reproduction signals, stacked layers comprising different recording materials have been applied to the multi-layered recording according to the present invention.

Figure 18:
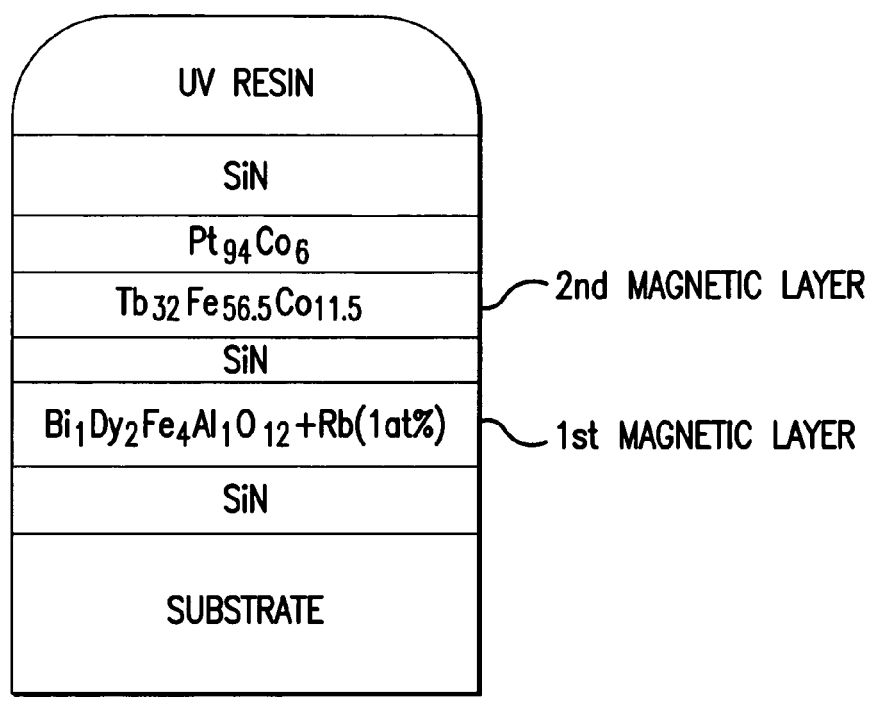
FIG. 18 conceptually shows a cross-sectional structure of a magneto-optical disk of the present invention produced in an eighth embodiment.
Figure 19:
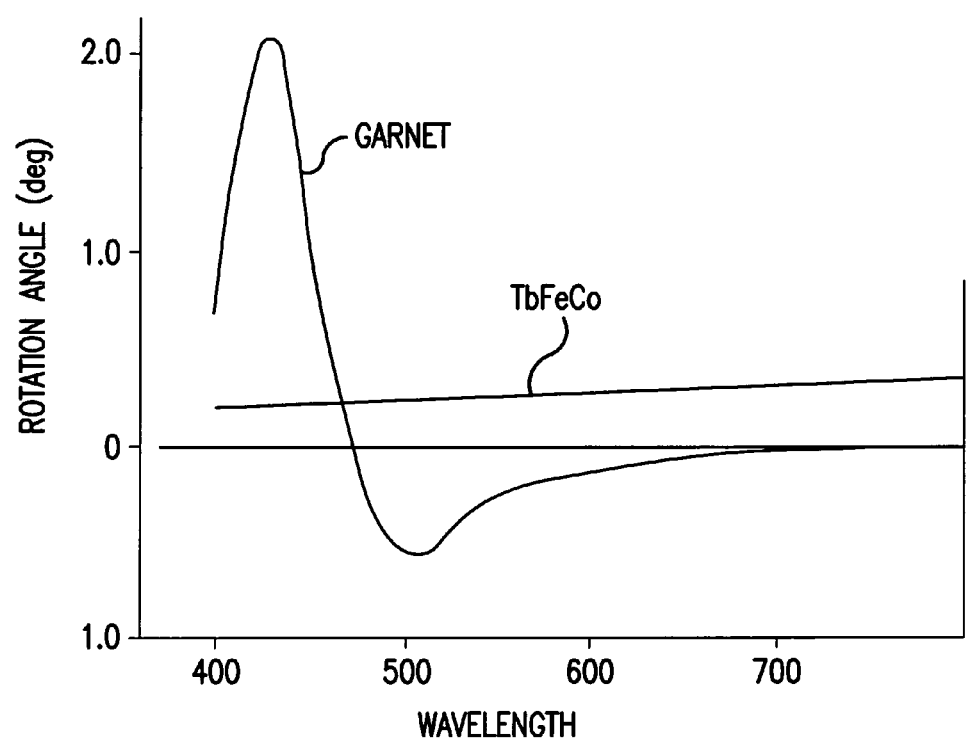
FIG. 19 shows a graph illustrating the change of the Kerr rotation angle depending on the measuring wavelength concerning a rare earth metal-transition metal alloy film and a garnet film used for magnetic layers of the magneto-optical disk produced in the eighth embodiment.

FIG. 18 shows an example in which a garnet film is used as a recording material for a first magnetic layer (recording layer), and a rare earth metal-transition metal alloy is used as a recording material for a second magnetic layer (recording layer). FIG. 19 shows the change in the Kerr rotation angle of thin films made of the respective recording materials with respect to the measuring wavelength. As for the rare earth metal-transition metal alloy, for example, TeFeCo, the Kerr rotation angle gradually decreases as the measuring wavelength becomes short as shown in FIG. 19. On the other hand, in the case of garnet, in general, the Kerr rotation angle remarkably changes depending on the change in wavelength, as compared with the rare earth metal-transition metal alloy. As shown in FIG. 19, garnet provides an extremely small Kerr rotation angle at a wavelength in a range of about 600 nm to 800 nm. However, at a wavelength in a range of about 400 nm to 450 nm, the Kerr rotation angle quickly increases, exhibiting a value of not less than 2 degrees at its maximum. Namely, when the medium having the stacked structure as shown in FIG. 18 is subjected to reproduction by using two laser beams having a wavelength in the range of about 600 nm to 800 nm and a wavelength in the range of about 400 nm to 450 nm, then the garnet thin film does not contribute to the Kerr rotation at a wavelength in the range of about 600 nm to 800 nm, and it serves as a thin film which simply effects the multiple interference action. Only the Kerr rotation caused by the rare earth metal-transition metal alloy dominantly contributes to reproduction signals on the other hand, in the case of a wavelength in the range of about 400 nm to 450 nm, an extremely large Kerr rotation angle caused by the garnet thin film dominantly contributes to reproduction signals. The difference in the Kerr rotation angle between respective magnetization states caused by optical multiple interference is further superimposed on the effect caused by the garnet thin film. The stacked structure as described above makes it possible to improve the reproduction efficiency on the multi-layered recording medium by using a plurality of laser beams having different wavelengths.

As described above, the magneto-optical recording medium according to this embodiment is characterized in that a plurality of magnetic layers, which have properties that the recording characteristic with respect to the recording magnetic field is mutually different between the respective magnetic layers, and simultaneously the magneto-optical effect such as the ellipticity and the Kerr rotation angle with respect to the measuring wavelength, especially the increasing point thereof is mutually different between them, are directly or indirectly stacked. Multi-layered recording can be achieved at a high S/N ratio by performing reproduction on the medium by using a plurality of laser beams having different wavelengths.

Next, a specified example of the medium having the feature as described above will be explained. At first, an SiN underlying base layer having a thickness of 80 nm was stacked by a sputtering method on a glass substrate applied with pre-pits and a guide groove for tracking for a laser beam spot. A garnet thin film as a first magnetic layer was deposited thereon. A material used herein was obtained by adding 1 atomic % of Rb to a garnet film, $Bi_1Dy_2Fe_4Al_1O_{12}$ produced by a pyrolysis method. In this method, nitrates of respective elements, i.e., $Bi(NO_3)_3.9H_2O$, $Dy(NO_3)_3.5H_2O$, $Fe(NO_3)_3.9H_2O$, and $Al(NO_3)_3.5H_2O$ were dissolved in water at predetermined concentrations and used for spin coating, followed by heating to achieve drying and crystallization. The film had a thickness of 120 nm. A two-layered film of TbFeCo/PtCo as a second magnetic layer was stacked thereon through an SiN layer having a thickness of 20 nm. A film having a composition ratio of $Tb_{32}Fe_{56.5}Co_{11.5}$ was stacked in a thickness of 45 nm, on which an alloy film having a composition ratio of $Pt_{94}Co_6$ was stacked in a thickness of 45 nm. An SiN layer as a protective film was stacked thereon in a thickness of 100 nm by means of sputtering. An ultraviolet-curable resin was spin-coated thereon, which was cured by ultraviolet irradiation.

It is preferred for the magnetic layer to use a substance providing a large magneto-optical effect at a wavelength of each of laser beams used for reproduction. This embodiment is exemplified by the use of the garnet film and the rare earth metal-transition-metal alloy for the magnetic layers. The garnet film may be also produced by sputtering. For example, those usable include materials obtained by substituting the rare earth element in the rare earth metal-iron-garnet produced by sputtering with Bi, such as $Y_{275}Bi_{0.25}Fe_5O_{12}$. In addition, a ferrite thin film composed of a base material such as (Y, Sm, Eu, Gd, Tb, Dy)$FeO_3$ and (Co, Ni, Fe, Mn)$Fe_2O_4$ is also a material which exhibits the characteristic increase in magneto-optical effect with respect to the wavelength, and thus such a material is preferably applicable to the present invention. As for the rare earth element-transition metal alloy, a system containing a light rare earth element such as Nd provides an increase in Kerr rotation angle in a short wavelength region. An alloy system of heavy rare earth metal-transition metal generally provides a decrease in Kerr rotation angle in a short wavelength region. Accordingly, a rare earth metal-transition metal alloy containing a light rare earth element is combined with a rare earth metal-transition metal alloy containing a heavy rare earth element to construct a group of magnetic layers of a medium. When reproduction is performed on such a medium by using a plurality of laser beams having predetermined wavelengths, then multi-layered recording can be achieved at a high S/N ratio. Alternatively, the Kerr rotation angle is also increased in a short wavelength region by using a film obtained by alternately stacking Pt and Co in thicknesses of several angstroms, the film being also applicable in the same manner as described above. The stacking order and the number of the magnetic layers may be arbitrarily determined.

An arbitrary dielectric protective film material may be used for each of the SiN layers. However, those especially preferred include, for example, nitride, oxide, fluoride, and carbide of Si, Ti, Al, Ta, Zr, Nb, and W. The refractive index and the thickness of these layers are selected in view of multiple interference and protective performance. They may be omitted, if necessary. The ultraviolet-curable resin layer may be also omitted, if necessary.

The magneto-optical recording medium, in which the first and second magnetic layers use mutually different materials for the magnetic layers as described above, may be used for the methods for recording and reproduction according to the fourth to seventh embodiments. Thus it is possible to obtain a reproduction signal having a more excellent S/N ratio.

Alternatively, both of the first and second magnetic layers may be formed of garnet films, and the composition of each of the garnet magnetic layers may be adjusted so that the reproduced signal-wavelength characteristic as shown in FIG. 2 or 5 may be obtained. In this arrangement, in addition to the effect of the multiple interference, it is possible to further increase the change of the difference in the Kerr rotation angle corresponding to each of the magnetization states with respect to the wavelength. Accordingly, a reproduced signal is obtained at a more excellent S/N ratio.

In the aforementioned embodiments, the present invention has been exemplified by the case in which the magneto-optical recording medium of the present invention is subjected to recording in accordance with the magnetic field modulation system. However, the method for recording on the magneto-optical recording medium of the present invention is not limited to the magnetic field modulation system, which is also applicable to optical modulation systems in which signal modulation is performed by using the pulse frequency of a recording light beam or the power of a recording light beam. The method of the present invention is applicable to all optical recording media provided with a plurality of magnetic layers in which the reproduction signal output from the multi-valued state differs in conformity with the use of reproducing light beams having different wavelengths as shown in FIGS. 2 and 5.

INDUSTRIAL APPLICABILITY

The magneto-optical recording medium of the present invention makes it possible to increase the reproduction signal intensity ratio in the multi-valued state determined by the combination of magnetization directions on a plurality of magnetic layers. Accordingly, it is possible to reproduce multi-valued information at a high S/N ratio. The magneto-optical recording medium of the present invention also makes it possible to reproduce information recorded on each of magnetic layers at different wavelengths for each of the magnetic layers. Accordingly, the recording medium is extremely effective, for example, for processing correlated information.

The method for recording and reproduction on the magneto-optical recording medium of the present invention enables the magneto-optical recording medium according to the present invention to be subjected to reproduction by using reproducing light beams having different wavelengths-so that information may be reproduced at a high S/N ratio as compared with the conventional reproduction method. According to the method for recording and reproduction on the magneto-optical recording medium of the present invention, information can be independently reproduced for every magnetic layer by using the magneto-optical recording medium of the present invention. According to the method for recording and reproduction on the magneto-optical recording medium of the present invention, it is possible to rewrite information on only one magnetic layer among a plurality of magnetic layers. Therefore, information can be independently recorded and reproduced on every magnetic layer by appropriately selecting the wavelength for recording and reproduction when the magneto-optical recording medium of the present invention is used. Accordingly, the present invention makes it possible to increase the recording density on the magneto-optical recording medium.

The invention claimed is:

1. A method for recording and reproduction on a magneto-optical recording medium including at least first and second magnetic layers, in which multi-valued information is recorded on the magneto-optical recording medium as a combination of magnetization states of the respective magnetic layers, and the multi-valued information is reproduced on the basis of an aggregate of the magnetization states of the respective magnetic layers, comprising:

irradiating the magnetic layers with a light beam having wave length $\lambda_1$ to reproduce first information recorded on the first magnetic layer;

storing the first information reproduced from the first magnetic layer; and irradiating the magnetic layers with a light beam having wavelength $\lambda_2$ ($\lambda_2 \neq \lambda_1$) to heat to a recording temperature of the magnetic layers while applying a magnetic field in accordance with a combination of the stored, first information and second information to be recorded on the second magnetic layer, so that the first information is re-recorded on to the first magnetic layer and the second information is recorded onto the second magnetic layer.

2. The method for recording and reproduction on the magneto-optical recording medium according to claim 1, wherein the light beam having wavelength $\lambda_1$ is used as a reproducing light beam, and the light beam having wavelength $\lambda_2$ is used as a recording light beam.

3. The method for recording and reproduction on the magneto-optical recording medium according to claim 1, wherein the light beam having wavelength $\lambda_1$ and the light beam having wavelength $\lambda_2$ are irradiated onto the recording medium so as to focus at different positions from each other in a track direction.

4. The method for recording and reproduction on the magneto-optical recording medium according to claim 1, wherein the light beam having wavelength $\lambda_1$ and the light beam having wavelength $\lambda_2$ are irradiated onto the recording medium so as to focus on adjacent recording tracks, respectively.

5. The method for recording and reproduction on the magneto-optical recording medium according to claim 1, wherein the light beam having wavelength $\lambda_1$ and the light beam having wavelength $\lambda_2$ are irradiated so that a distance between beam spots formed on the recording medium is adjusted to an appropriate length based on characteristics of a memory for storing the information on the first magnetic layer and a circuit for modifying a magnetic field.

6. The method for recording and reproduction on the magneto-optical recording medium according to claim 1, wherein the reproduced information on the first magnetic layer is stored by a memory.

7. The method for recording and reproduction on the magneto-optical recording medium according to claim 1, wherein the recording temperature is not less than Curie temperatures of the first and second magnetic layers.

8. The method for recording and reproduction on the magneto-optical recording medium according to claim 1, wherein only the second magnetic layer is substantially rewritten.

9. The method for recording and reproduction on the magneto-optical recording medium according to claim 1, wherein the magneto-optical recording medium to be used is a magneto-optical recording medium in which an order of intensities of a plurality of reproduction signals detected for a plurality of magnetization states determined by the combination of the magnetization states, obtained upon detection at the wavelength $\lambda_1$, is mutually different from that obtained upon detection at the wavelength $\lambda_3$ ($\lambda_3 \neq \lambda_1$).

10. The method for recording and reproduction on the magneto-optical recording medium according to claim 9, wherein information recorded on the first magnetic layer is reproduced by radiating a light beam having the wavelength $\lambda_1$, while the reproduced information is combined with information to be recorded on the second magnetic layer to perform recording by using a recording light beam having the wavelength $\lambda_2$, and thus only information on the second magnetic layer is rewritten.

11. The method for recording and reproduction on the magneto-optical recording medium according to claim 9, wherein $\lambda_1$ is 350 to 900 nm, and $\lambda_3$ is a wavelength different from $\lambda_1$ by not less than 50 nm.

12. The method for recording and reproduction on the magneto-optical recording medium according to claim 1, wherein a ratio of magnitudes of Kerr rotation angles read from a plurality of magnetization states determined by the combination of the magnetization states, obtained upon reproduction by using the light beam having a wavelength $\lambda_1$, is mutually different from that obtained upon reproduction by using the light beam having a wavelength $\lambda_3$ ($\lambda_3 \neq \lambda_1$).

13. The method for recording and reproduction on the magneto-optical recording medium according to claim 1, wherein magnitudes of Kerr rotation angles read from a plurality of magnetization states determined by the combination of the magnetization states differ depending on a wavelength of a reproducing light beam respectively; and the magneto-optical recording medium has a magneto-optical characteristic that a curve, which represents variation in the Kerr rotation angle with respect to the wavelength of the reproducing light beam detected from one combined magnetization state, intersects a curve which represents variation in the Kerr rotation angle with respect to the wavelength of the reproducing light beam detected from at least one of other combined magnetization states, in a wavelength range of $\lambda_1$ to $\lambda_3$ of the wavelength of the reproducing light beam.

14. The method for recording and reproduction on the magneto-optical recording medium according to claim 13, wherein the magneto-optical recording medium comprises at least a dielectric layer, the first and second magnetic layers, and an auxiliary magnetic layer on the substrate, wherein at least one of the first and second magnetic layers is represented by the following general formula:

$$(Tb_{100-A}Q_A)_X Fe_{100-X-Y-Z} Co_Y M_Z$$

wherein
15 atomic % $\leq X \leq$ 40 atomic %;
5 atomic % $\leq Y \leq$ 20 atomic %;
0 atomic % $\leq Z \leq$ 15 atomic %;
0 atomic % $\leq A \leq$ 30 atomic %;
wherein M is at least one of elements selected from the group consisting of Nb, Cr, Pt, Ti, and Al, and Q is at least one of elements selected from the group consisting of Gd, Nd, and Dy.

* * * * *